(12) United States Patent
McCormick

(10) Patent No.: US 11,881,914 B1
(45) Date of Patent: Jan. 23, 2024

(54) DETERMINATION OF ELECTRONIC BEAM STEERING ANGLES

(71) Applicant: Space Exploration Technologies Corp., Hawthorne, CA (US)

(72) Inventor: Martin S. McCormick, Studio City, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

(21) Appl. No.: 17/333,818

(22) Filed: May 28, 2021

Related U.S. Application Data

(60) Provisional application No. 63/032,844, filed on Jun. 1, 2020, provisional application No. 63/032,859, filed on Jun. 1, 2020.

(51) Int. Cl.
*H04W 16/28* (2009.01)
*H04B 7/185* (2006.01)
*H04B 7/0426* (2017.01)
*H04B 17/318* (2015.01)
*H04B 7/06* (2006.01)

(52) U.S. Cl.
CPC .......... *H04B 7/043* (2013.01); *H04B 7/0617* (2013.01); *H04B 7/18513* (2013.01); *H04B 17/318* (2015.01); *H04W 16/28* (2013.01)

(58) Field of Classification Search
CPC .... H04B 7/043; H04B 17/318; H04B 7/0617; H04B 7/18513; H04W 16/28
See application file for complete search history.

(56) References Cited

U.S. PATENT DOCUMENTS

| 2008/0018545 | A1 | 1/2008 | Kaplan et al. |
| 2017/0084994 | A1* | 3/2017 | Tran .......................... H01Q 3/08 |
| 2018/0241464 | A1 | 8/2018 | Michaels |
| 2019/0379446 | A1* | 12/2019 | Rothaar ............. H04B 7/18541 |
| 2021/0107651 | A1 | 4/2021 | Shannon et al. |

(Continued)

FOREIGN PATENT DOCUMENTS

| EP | 2237445 A2 | 10/2010 |
| JP | 2014075679 A | 4/2014 |

OTHER PUBLICATIONS

Davenport, P.B.: A Vector Approach to the Algebra of Rotations with Applications. NASA Technical Note. https://ntrs.nasa.gov/archive/nasa/casi.ntrs.nasa.gov/19680021122.pdf. 32 Total Pages (1968).

(Continued)

*Primary Examiner* — David S Huang
(74) *Attorney, Agent, or Firm* — Polsinelli PC

(57) ABSTRACT

In an embodiment, an apparatus includes an antenna assembly, a modem, and a beam steering controller. A beam steering controller is configured to determine a beam pointing direction of the antenna assembly to be able to one or both of switch a first communication link with a first satellite to a second communication link with a second satellite or establish and maintain the first communication link with the first satellite. At a start of a determination of the beam pointing direction, one or more of an orientation of the antenna assembly is unknown, positions of a plurality of satellites are unknown, or downlink frequencies of the plurality of satellites are unknown.

19 Claims, 15 Drawing Sheets

(56) References Cited

U.S. PATENT DOCUMENTS

2021/0151876 A1  5/2021  Farsi et al.
2021/0208286 A1  7/2021  Turpin et al.

OTHER PUBLICATIONS

Markley, F.L.: Attitude Determination using Vector Observations and the Singular Value Decomposition. Journal of the Astronautical Sciences 36(3): 245-258 (1988).
Markley et al.: New Developments in Quaternion Estimation from Vector Observations. 20 Total Pages (2000).

* cited by examiner

DETERMINATION OF ELECTRONIC BEAM STEERING ANGLES

CROSS-REFERENCE TO RELATED APPLICATIONS

This application claims priority to U.S. Provisional Patent Application Nos. 63/032,859 entitled "DETERMINATION OF SPATIAL ORIENTATION" and 63/032,844 entitled "DETERMINATION OF ELECTRONIC BEAM STEERING ANGLES", both filed on Jun. 1, 2020, the contents of which are hereby incorporated by reference in their entirety and for all purposes.

BACKGROUND

In wireless communication systems, information is relayed from an originating device to a destination device via one or more intermediating devices, thereby forming a communication chain. The communication link between one or more respective pairs of devices in the communication chain can include wireless communication links. If the information includes a request, data for which receipt is to be acknowledged, a command for which receipt is to be acknowledged, and/or the like, appropriate information is relayed back to the originating device. Typically, many such one-way or round-trip communications occur for the originating device. Reliability in the ability to send and receive communications, and for such communications to be of sufficient signal quality, are among the on-going challenges for wireless communication systems.

Reliability, signal quality, and other challenges faced by wireless communication systems are further exaggerated in satellite communication systems, in which at least some of the intermediating devices—satellites in a satellite constellation orbiting Earth—are in constant motion at high velocity relative to ground equipment associated with respective users (e.g., originating devices). Ground equipment associated with a user communicates with different satellites over time to send and receive communications within a network.

Because the distance between ground equipment and a satellite is large, even slight changes in the ground equipment's beam angular direction can be non-negligible by the time the beam reaches a satellite. Ground equipment also has limited or no information about the rest of the network, especially at start up, since network information such as satellite locations or orbiting schedule is obtained from satellites to which they are able to establish and maintain a communication link.

BRIEF DESCRIPTION OF THE DRAWINGS

The foregoing aspects and many of the attendant advantages of the embodiments of the present disclosure will become more readily appreciated as the same become better understood by reference to the following detailed description, when taken in conjunction with the accompanying drawings, wherein.

DETAILED DESCRIPTION

Figure 1:
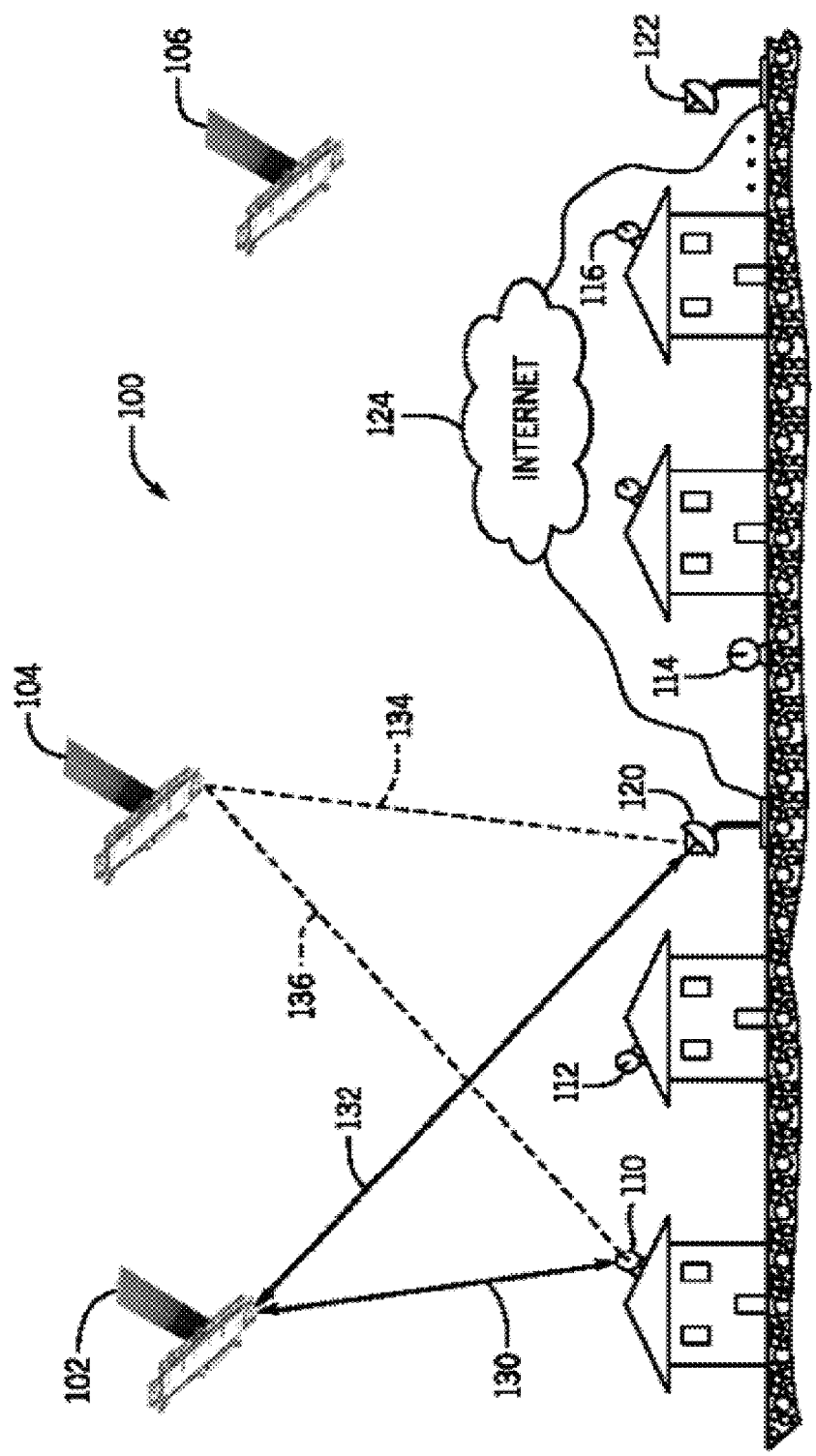
FIG. 1 illustrates a diagram showing an example wireless communication system in accordance with various aspects of the present disclosure.

Embodiments of apparatuses and methods relate to determination of beam steering angles of user equipment included in a satellite communication system.

In order to address the issues raised above, it would be advantageous for ground equipment associated with a user having little or no information about the network to be able to find and establish a communication link with a satellite in a relative short time period. It would also be advantageous for ground equipment associated with a user to be able to maintain a communication link with a satellite over time, including the ability to switch to a different satellite as needed. It would be further advantageous for ground equipment associated with a user to be able to ascertain its location and orientation. Accordingly, embodiments of the present disclosure are directed to these and other improvements in ground equipment included in wireless communication systems or portions thereof.

In some embodiments, a device includes an antenna assembly configured to transmit and receive beams with a first satellite, a modem electrically coupled to the antenna assembly; and a beam steering controller electrically coupled to each of the antenna assembly and the modem, the beam steering controller configured to determine a beam pointing direction of the antenna assembly to be able to one or both of switch a first communication link with the first satellite to a second communication link with a second satellite or establish and maintain the first communication link with the first satellite. At a start of a determination of the beam pointing direction, one or more of an orientation of the antenna assembly is unknown, positions of a plurality of satellites are unknown, or downlink frequencies of the plurality of satellites are unknown. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface", "bottom surface", "vertical", "horizontal", and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or processor-executable instructions, including routines executed by a programmable computer, processor, controller, chip, and/or the like. Those skilled in the relevant art will appreciate that the technology can be practiced on computer/controller systems other than those shown and described above. The technology can be embodied in a special-purpose computer, controller, or processor that is specifically programmed, configured or constructed to perform one or more of the computer-executable instructions described above. Accordingly, the terms "computer," "controller," "processor," or the like as generally used herein refer to any data processor and can include Internet appliances and hand-held devices (including palm-top computers, wearable computers, cellular or mobile phones, multi-processor systems, processor-based or programmable consumer electronics, network computers, mini computers, and the like). Information handled by these computers can be presented at any suitable display medium, including an organic light emitting diode (OLED) display or liquid crystal display (LCD).

FIG. 1 illustrates a diagram showing an example wireless communication system 100 in accordance with various aspects of the present disclosure. System 100 includes a satellite-based communication system including a plurality of satellites orbiting Earth in, for example, a non-geostationary orbit (NGO or NGSO) constellation. It is understood that system 100 can also include any of a variety of wireless communication systems such as, but not limited to, a low earth orbiting (LEO) communication system, a non-earth based communication system, a ground-based communication system, a space-based communication system, and/or the like.

Of the plurality of satellites included in the satellite constellation, at least three satellites of the plurality of satellites (e.g., satellites 102, 104, and 106) are shown in FIG. 1 for illustrative purposes. System 100 further includes ground or terrestrial based equipment configured to communicate with the plurality of satellites, such equipment including a plurality of user equipment and a plurality of gateways. User equipment 110, 112, 114, and 116 of the plurality of user equipment are shown in FIG. 1. Gateways 120, 122 of the plurality of gateways are also shown in FIG. 1. Each of the satellites, user equipment, and gateways within system 100 is also referred to as a node, system node, communication node, and/or the like.

Each user equipment of the plurality of user equipment is associated with a particular user. User equipment is configured to serve as a conduit between the particular user's device(s) and a satellite of the plurality of satellites which is in communication range of the user equipment, such that the particular user's device(s) can have access to a network 124 such as the Internet. Each user equipment is particularly positioned in proximity to the associated user's device(s). For example, user equipment 110, 112, and 116 are located on the respective users' building roof and user equipment 114 is located on a yard of the user's building. A variety of other locations is also contemplated for the user equipment. User equipment may also be referred to as user terminals, end use terminals, end terminals, user ground equipment, ground-based communication device, and/or the like.

At any given time, a communication link established between a particular satellite and a particular user equipment facilitates access to the network 124 by the user associated with the particular user equipment. One or more user devices (e.g., a smartphone, a tablet, a laptop, an Internet of Things (IoT) device, wearable device, and/or the like) is in wired or wireless communication with user equipment 110. If, for example, the user requests a web page via a user device, the user device relays the request to user equipment 110. User equipment 110 can establish a communication link 130 to the satellite 102 and transmit the request. Satellite 102, in response, establishes a communication link 132 with an accessible gateway 120 to relay the request. The gateway 120 has wired (or wireless) connections to the network 124. The data associated with rendering the requested web page is returned in the reverse path, from the gateway 120, communication link 132, satellite 102, communication link 130, user equipment 110, and to the originating user device. The requested web page is then rendered on the originating user device.

If satellite 102 moves out of position relative to user equipment 110 before the requested data can be provided to user equipment 110 (or otherwise becomes unavailable), then gateway 120 establishes a communication pathway 134, 136 with a different satellite, such as satellite 104, to provide the requested data.

In some embodiments, one or more gateway of the plurality of gateways includes repeaters that lack a wired connection to the network 124. A repeater is configured to relay communications to and/or from a satellite that is a different satellite from the one that directly communicated with a user equipment or gateway. A repeater is configured to be part of the communication pathway between a user equipment and gateway. A repeater may be accessed in cases where a satellite does not have access to a gateway, and thus has to send its communication to another satellite that has access to a gateway via the repeater. Repeaters can be located terrestrially, on water (e.g., on ships or buoys), in airspace below satellite altitudes (e.g., on an airplane or balloon), and/or other Earth-based locations. Accordingly, the plurality of gateways may also be referred to as Earth-based network nodes, Earth-based communication nodes, and/or the like.

In some embodiments, one or more transmitter system and one or more receiver system are included in each user equipment, satellite, and gateway (and repeater) of system 100. If a node includes more than one transmitter system, the respective transmitter systems may be the same or different from each other. More than one receiver system included in a node may similarly be the same or different from each other.

Wireless communication using NGO satellite constellations poses certain challenges for ground-based user equipment. In contrast to geosynchronous satellites, in which each satellite appears at a fixed point in the sky, NGO satellite constellations are composed of satellites that rapidly move across the sky in different directions relative to the ground. The user equipment finds and tracks these satellites to establish and maintain wireless communication with them.

In some embodiments, each user equipment of the plurality of user equipment included in system 100 includes a phased array antenna. Phased array antennas are capable of dynamically pointing a radio frequency (RF) beam in a particular direction. The RF beam is highly controlled electronically (e.g., electronically beam steered) to accurately point in the desired direction. For example, transmit and receive beams having a pointing error of less than 0.1 degree result in beams having sufficient antenna gain in high-throughput communication applications. Such pointing accuracy is maintained even during switching or handing off between different satellites in order to avoid gaps in reception or transmission and data packet loss. Accurate pointing of the transmission beam also facilitates non-interference with other satellites and prevents radio emissions in undesired or disallowed directions, such as to the geostationary satellite arc. The electronic beam steering of the present disclosure is configured to achieve such operational parameters.

At least three types of data facilitate accurate electronic beam steering of beams of a phased array antenna included in a user equipment (e.g., user equipment 110) towards a satellite (e.g., satellite 102): (1) a position of the satellite in space, (2) a position of the user equipment, and (3) a physical orientation of the user equipment's phased array antenna (the physical tilt of the radiating side of the antenna panel including the phased array antenna).

From a user equipment's perspective, the first type of data—satellite position—is usually unknown prior to contact with an NGO constellation, especially if the satellites are the user equipment's sole source of data connectivity. Even if a given user equipment established contact with one or more satellites in the past, previous knowledge of satellite orbits (ephemeris) quickly becomes outdated, since the exact satellite trajectories are subject to change depending on a number of factors such as, but not limited to, the condition and health of constituent satellites, engine burn plans, operating requirements, and/or the like. Low-Earth orbit satellites, in particular, can be affected by unpredictable drag forces and have orbital trajectories that can be difficult to extrapolate very far into the future. If a user equipment successfully contacts a satellite, that single satellite can send downlink messages to the user equipment containing its updated ephemeris (and ephemerides of other satellites). However, that initial/first satellite is to be located by the user equipment independently of satellite ephemeris information (or information from other nodes of system 100) as disclosed herein.

The second type of data—user equipment position—can be determined by the user equipment in a number of ways. User equipment position accuracy to about 1 kilometer (km), depending on the altitude of the satellite orbits, can be sufficient. For example, without limitation, a location can be determined by global positioning system (GPS) if user equipment includes a GPS receiver. As another example, user equipment location can be determined using true range and Doppler frequency multi-lateration technique with the initial/first satellite. Other approaches to determining the location of the user equipment can be used as well.

The third type of data—physical orientation, or attitude, of the user equipment phased array antenna—can be unknown by the user equipment prior to contact with a satellite. An electronic phased array beam is pointed relative to the phased array antenna panel plane, and the accuracy of the beam pointing direction is a function of the accuracy of the user equipment's own orientation determination. The physical orientation of the antenna panel in three-dimensional (3-D) space can be decomposed into three axis or orientation angles: tilt angle $\theta$ (e.g., pitch angle or ground elevation of the array broadside), pan angle (e.g., yaw angle or ground azimuth of the array broadside), and roll angle $\phi$ (e.g., rotation angle of the array around its broadside vector). Each of these angles is accurately determined in the electronic beam steering determination technique disclosed herein to calculate a correct pointing direction.

In some embodiments, user equipment may not be professionally installed, and the three orientation angles of the phased array panel may not be particularly configured. During installation, whether professionally installed or self-installed by a user, the panel orientation can be flexible (or set to a default orientation) since certain orientations may simplify mounting the user equipment, depending on available mounting structures (e.g., if mounting on a sloping rooftop, it may be difficult to determine exact orientation). After installation, the user equipment can experience wind-induced vibration, building sway, mechanical drift, thermal expansion, platform motion, ground settling, and/or other effects which may change the orientation of the phased array panel over time. The user equipment may also be moved to another location after first installation if, for example, the user moves to a different residence or is moved for a better line of sight to the sky due to changes in the tree line. Even if accurately orientated initially, the panel is unlikely to maintain the desired orientation over time. Hence, the electronic beam determination technique(s) disclosed herein is configured for the user equipment to estimate its phased array orientation at system start up and to track its orientation over time to account for possible changes throughout normal operation.

The electronic beam steering determination technique(s) disclosed herein can be implemented by a beam steering controller included in each user equipment of the plurality of user equipment of system 100. As will be described in detail below, the beam steering controller is configured, without limitation, to find and make initial contact with an initial satellite, track the initial satellite, and estimate associated parameters (e.g., array panel orientation) to enable sustained wireless communications with the initial satellite and over time, with one or more additional satellites of the satellite constellation.

Figure 2:
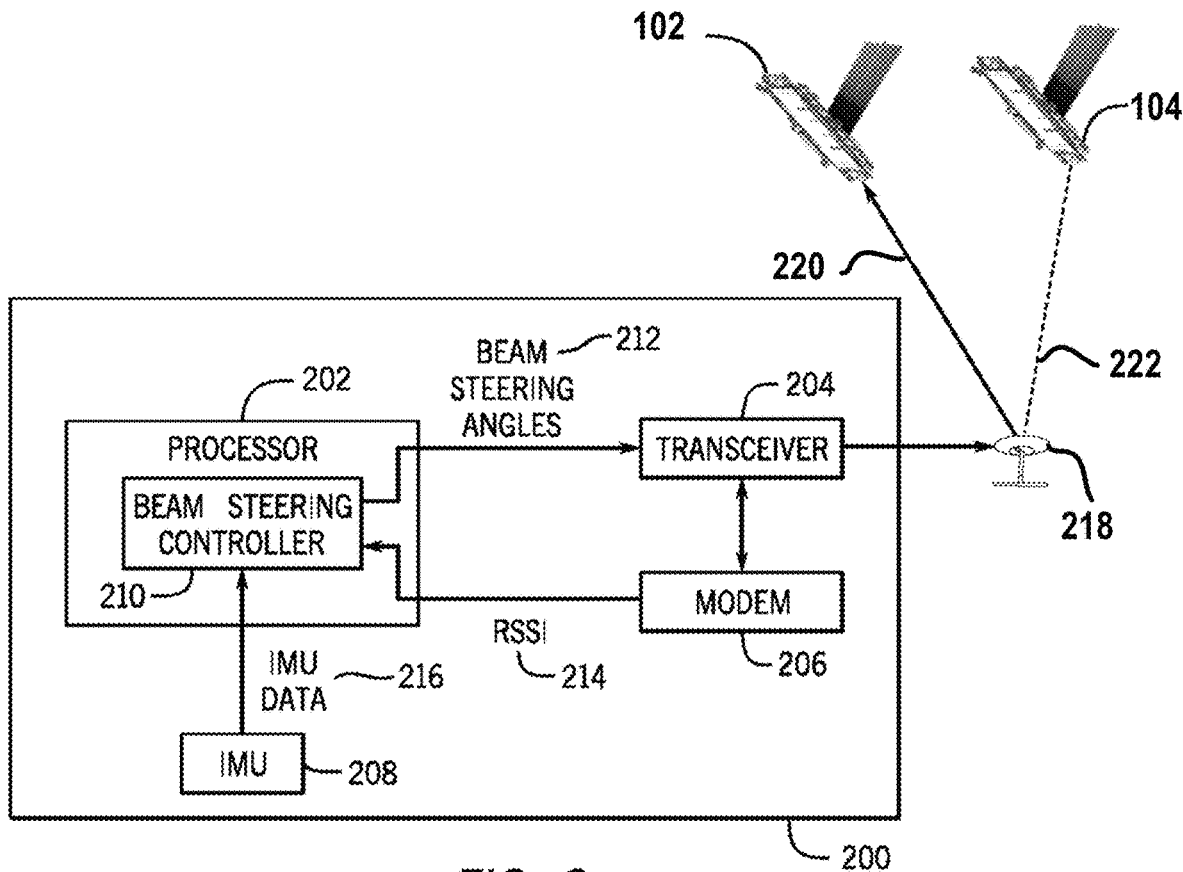
FIG. 2 illustrates a block diagram of a user equipment configured to implement an electronic beam steering determination technique in accordance with various aspects of the present disclosure.

FIG. 2 illustrates a block diagram of a user equipment 200 configured to implement an electronic beam steering determination technique in accordance with various aspects of the present disclosure. User equipment 200 is an example of any user equipment of the plurality of user equipment shown in FIG. 1.

In some embodiments, user equipment 200 includes, without limitation, one or more of each of a processor 202, a transceiver 204, a modem 206, an inertial measurement unit (IMU) 208, and an antenna assembly 218. Processor 202 includes, but is not limited to, a beam steering controller 210. Beam steering controller 210 is configured to communicate with each of the transceiver 204, modem 206, and IMU 208. Transceiver 204 and modem 206 communicate with each other. Transceiver 204 and antenna assembly 218 communicate with each other.

Transceiver 204 is configured to perform signal processing to convert data signals from modem 206 into radio frequency (RF) signals for wireless transmission, and to convert RF signals received from a satellite into data signals for modem 206. In some embodiments, transceiver 204 includes one or more of each of a transmitter and receiver assembly. Transceiver 204 includes (digital) beamforming components configured to encode RF signals to be transmitted and decode RF signals received, RF components configured to modulate RF signals to be transmitted and demodulate RF signals received, and/or the like.

In some embodiments, transceiver 204 can be coupled to antenna assembly 218, which can include the associated electrical components or circuitry, such as the plurality of antenna elements arranged to form the phased array antenna panel. User equipment 200 is configured to transmit signals to and receive signals from a first satellite 102 and a second satellite 104 included in a satellite constellation. User equipment 200 can establish a communication link 220 with the first satellite 102. If the first satellite 102 moves out of position relative to the user equipment 200 (or otherwise becomes unavailable), the user equipment can establish a second communication link 222 with the second satellite 104.

Modem 206 is configured to provide data signals to be transmitted to the transceiver 204. An example of a data signal from modem 206 includes a web page request corresponding to a user requesting a particular web page on a user device in communication with user equipment 200.

Modem 206 is also configured to receive data signals from the transceiver 204, in which such data signals correspond to received RF signals from a satellite. Modem 206 is configured to process the received data signals for providing to the appropriate user device. Modem 206 can also perform one or more signal quality measurements using the received data signals, such as determination of a received signal strength indicator (RSSI) 214, signal-to-noise ratio (SNR), band power measurement, and/or the like. RSSI 214 includes an estimated measure of the power level of the satellite-transmitted signals received at user equipment 200. The higher the RSSI value, the closer the current beam steering direction is to an optimal beam steering direction for that point in time with the satellite.

IMU 208 is configured to detect changes in pitch, roll, and/or yaw of user equipment 200, and generate IMU data 216 indicative of such detection. IMU 208 includes, without limitation, a gyroscope such as those configured in integrated microelectromechanical systems (MEMS) device. In some embodiments, IMU 208 can include a low-cost IMU gyroscope such that the generated IMU data 216 has limited or low accuracy as to actual pitch, roll, and/or yaw changes. Pitch is also referred to as tilt and yaw is also referred to as pan. A GPS receiver unit can also be included in the IMU 208, or the GPS receiver may be located separate from IMU 208.

RSSI 214 and IMU data 216 can be inputs to beam steering controller 210. Beam steering controller 210 can be configured to perform calculations based on RSSI 214 and IMU data 216 to determine beam steering angles 212, as will be described in detail below. Beam steering angles 212 are inputs to transceiver 204. Transceiver 204 is dynamically configured in order for the user equipment's phased array antenna panel (e.g., as included in transceiver 204 and/or the antenna assembly 218) to operate at a beam direction as set forth in the beam steering angles 212.

Figure 3A:
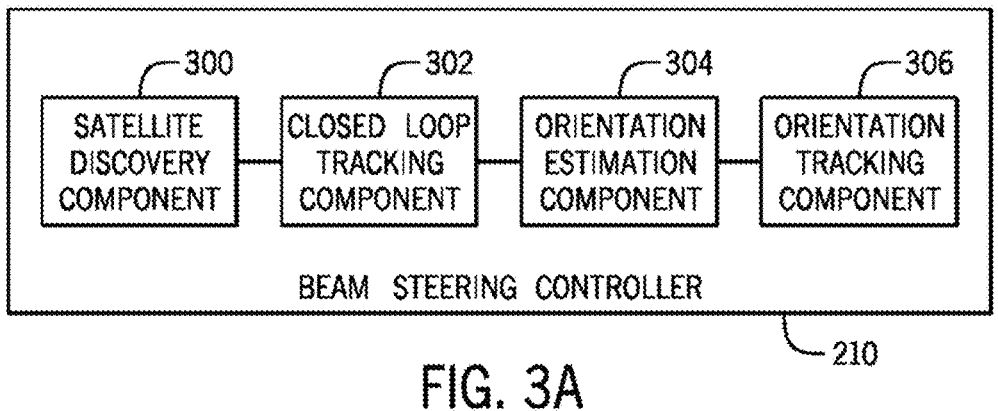
FIG. 3A illustrates a block diagram showing example components configured to implement the beam steering determination technique in accordance with various aspects of the present disclosure.
Figure 3B:
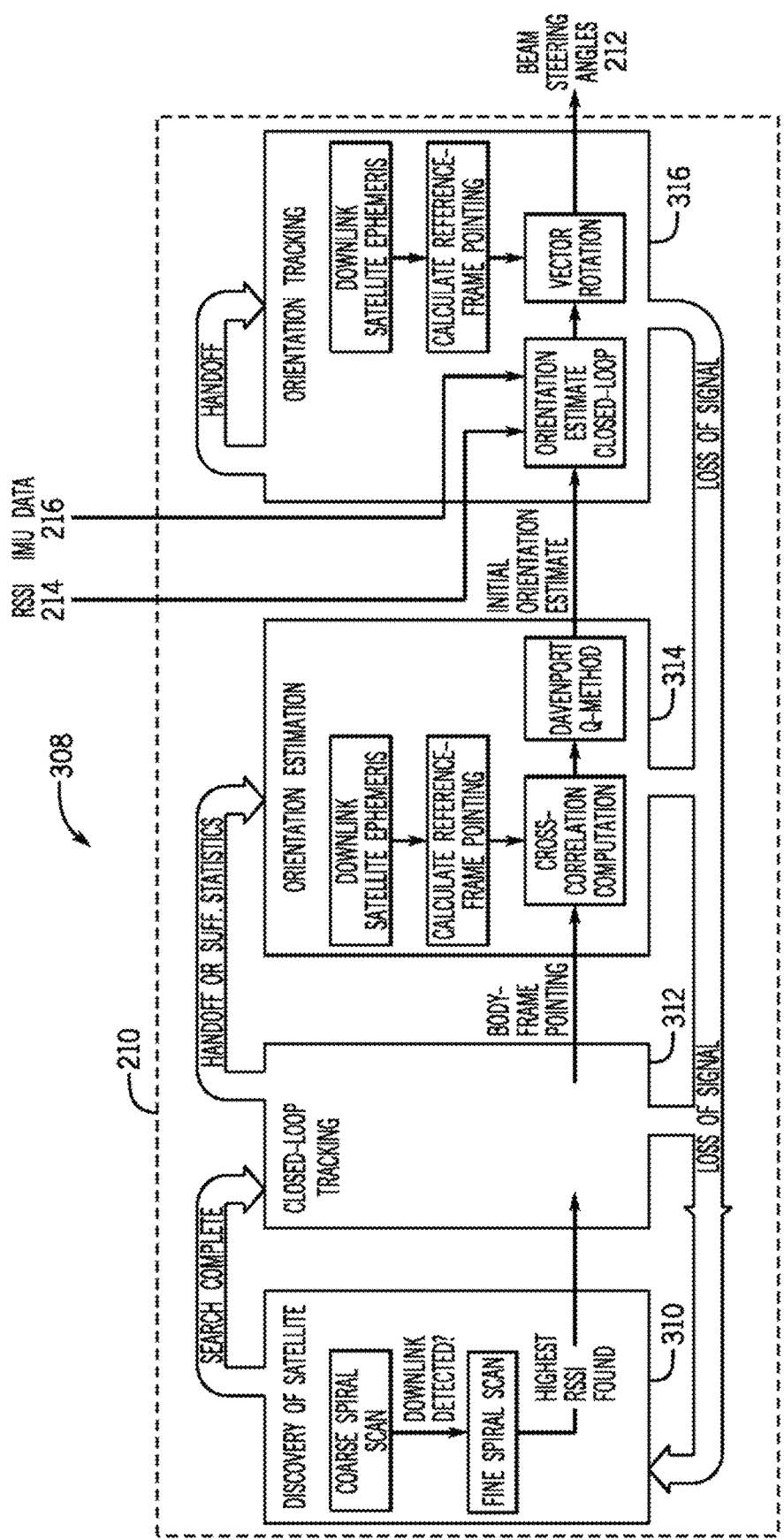
FIG. 3B illustrates an example process showing the stages of the beam steering determination technique associated with the components of FIG. 3A in accordance with various aspects of the present disclosure.

FIG. 3A illustrates a block diagram showing example components of the beam steering controller 210 and configured to implement the beam steering determination technique in accordance with various aspects of the present disclosure. FIG. 3B illustrates an example process 308 showing the stages of the beam steering determination technique associated with the components of FIG. 3A in accordance with various aspects of the present disclosure.

In some embodiments, beam steering controller 210 includes a satellite discovery component 300, a closed-loop tracking component 302, an orientation estimation component 304, and an orientation tracking component 306. Satellite discovery component 300 is configured to perform a first stage 310 of process 308—satellite discovery. Satellite discovery component 300 is configured to find any initial satellite within the constellation that is assigned to downlink to a geographic cell, sector, or coverage area associated with user equipment 200. Satellite discovery component 300 performs, among other things, a coarse spiral sky search for any satellite, and if a downlink is detected, performs a fine spiral sky search to identify the best beam pointing angle (also referred to as a beam pointing direction, beam pointing vector, beam pointing, and/or the like) with the detected satellite in accordance with the highest RSSI. This identified satellite is also referred to as the discovered satellite, first discovered satellite, satellite of interest, and/or the like. Once the initial satellite has been identified, and the best initial pointing identified, the first stage 310 is complete and process 308 proceeds to a second stage 312.

Closed-loop tracking component 302 is configured to perform the second stage or closed-loop tracking stage 312 of process 308 closed-loop to track the identified satellite. Closed-loop tracking component 302 is configured to maintain a communication link with the identified satellite while it moves by using steering perturbations and modem-provided RSSI 214 as an error metric. Closed-loop tracking component 302 also obtains information from the identified satellite for use in subsequent stage(s) of process 308. Closed-loop tracking component 302 generates body frame pointing information based on the steering perturbations and RSSI 214. If switching to a different satellite is imminent, due to the satellite signaling a handoff, the identified satellite moving out of the user equipment's cell, RSSI values below a threshold, and/or the like, then the second stage or closed-loop tracking stage 312 is complete and process 308 proceeds to a third stage 314 for orientation estimation.

Orientation estimation component 304 is configured to perform the third stage 314 of process 308—phased array antenna panel orientation estimation. Orientation estimation component 304 is configured to determine the three-axis orientation angles (tilt, pan, and roll angles) of the phased array antenna panel of user equipment 200. Orientation estimation is determined by obtaining the identified satellite's ephemeris, calculating reference frame pointing information based on the satellite ephemeris, cross correlating the reference frame pointing information against the body frame pointing information determined in second stage 312, and applying the cross correlation to a Davenport Q-method to generate an initial orientation estimate. With the initial orientation estimate, third stage 314 is complete and process 308 proceeds to a fourth stage 316 involving orientation tracking.

Orientation tracking component 306 is configured to perform the fourth stage 316 of process 308—orientation tracking of the phased array antenna panel over time. Orientation tracking component 306 determines changes in panel orientation and generates updated beam steering angles to maintain optimal beam direction over time. Orientation tracking also permits handing off to a different satellite, as necessary. Orientation tracking is performed by obtaining the satellite ephemeris, calculating reference frame pointing information, determining a closed-loop orientation estimate based on the initial orientation estimate, RSSI 214, and IMU data 216, and updating the beam steering direction (e.g., beam steering vector rotation) based on the closed-loop orientation estimate and reference frame pointing information. The output of orientation tracking component 306 includes (updated) beam steering angles 212. Beam steering angles 212 are also referred to as a beam steering vector, beam pointing angles, beam pointing vector, beam pointing direction, or the like.

During any of stages 310-316, if user equipment 200 experiences a loss of signal from the current satellite of interest (e.g., the communication link with the satellite is broken), then process 308 returns to first stage 310 to find an initial satellite.

First stage 310 is also referred to as a satellite discovery stage. Second stage 312 is also referred to as a closed-loop tracking stage. Third stage 314 is also referred to as an orientation estimation stage. Fourth stage 316 is also referred to as an orientation tracking stage.

In some embodiments, one or more of components 300-306 (or a portion thereof) includes one or more instructions embodied within a tangible or non-transitory machine (e.g., computer) readable storage medium, which when executed by a machine causes the machine to perform the operations described herein. Components 300-306 (or a portion thereof) may be stored local or remote from processor 202 and/or beam steering controller 210. Processor 202 can be configured to execute components 300-306 (or a portion thereof). Components 300-306 (or a portion thereof) may be referred to as modules, engines, software, and/or the like. In alternative embodiments, one or more of components 300-306 (or a portion thereof) may be implemented as firmware or hardware such as, but not limited to, an application specific integrated circuit (ASIC), programmable array logic (PAL), field programmable gate array (FPGA), and/or the like. In other embodiments, one or more of components 300-306 (or a portion thereof) may be implemented as software while other of the components 300-306 (or a portion thereof) may be implemented as firmware and/or hardware.

Figure 4:
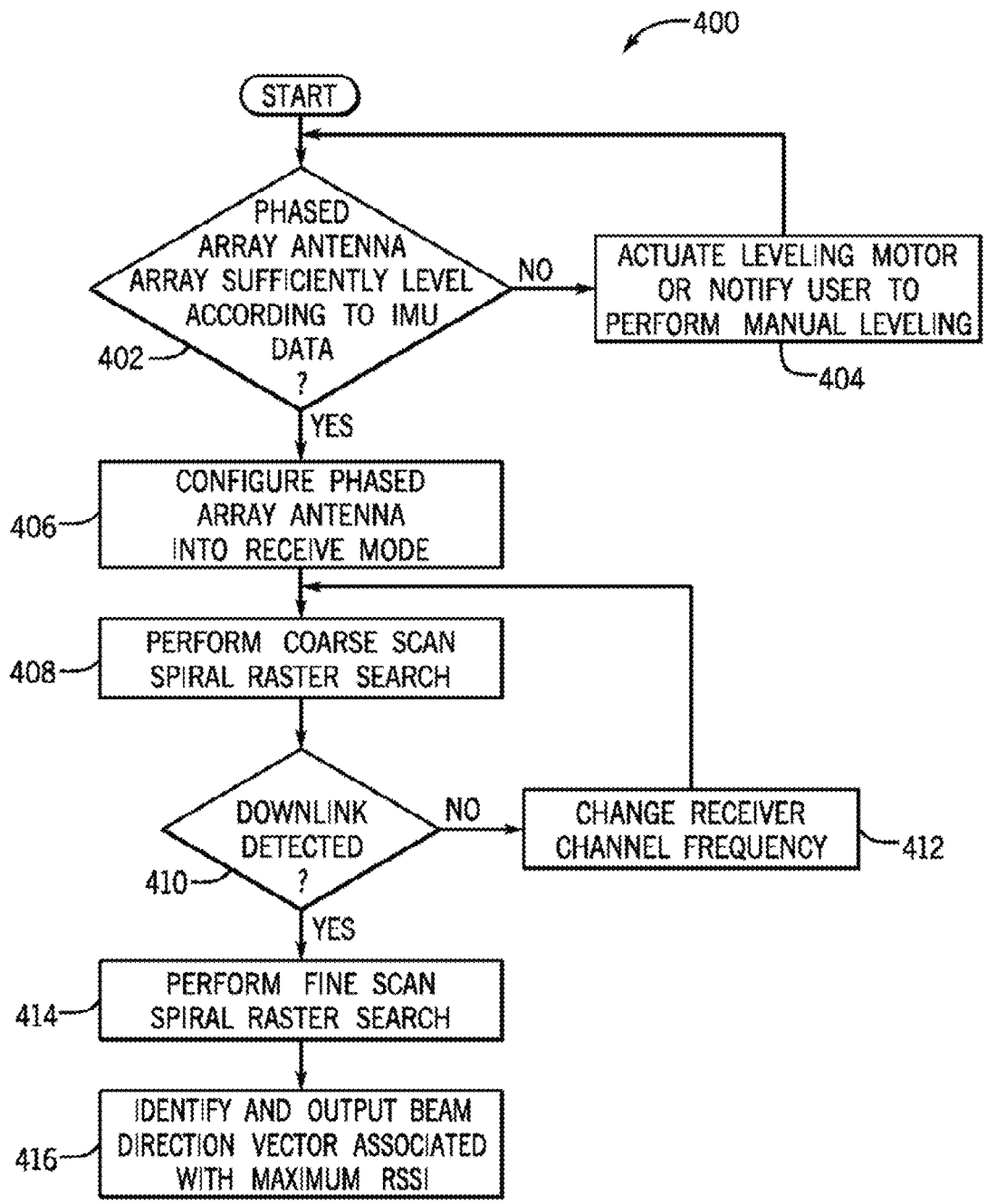
FIG. 4 illustrates a flow diagram showing a process for performing satellite discovery by the satellite discovery component in accordance with various aspects of the present disclosure.

FIG. 4 illustrates a flow diagram showing a process 400 for performing satellite discovery by the satellite discovery component 300 in accordance with various aspects of the present disclosure.

At a block 402, satellite discovery component 300 is configured to determine whether the plane of the phased array antenna from which the beam radiates is level based on IMU data 216 provided by IMU 208. For satellite discovery, the radiating side of the phased array antenna is to be physically oriented to have sufficient visibility of the sky. While the phased array antenna can electronically steer its beam in any number of directions, the effective beam direction range can be limited by practical factors such as low elevation obstructions (e.g., trees, buildings, etc.), scan loss (e.g., cosine loss), and/or the like. Hence, at least a rough or approximate leveling of the radiating side of the phase array antenna (the array plane, radiating plane, or panel plane) to face/point skyward with sufficient line of sight toward potential satellites is beneficial.

If the array plane is not sufficiently level (no branch of block 402), then process 400 proceeds to block 404. Leveling with a residual tilt error (relative to an ideal tilt angle) in the range of approximately ±5 degrees is deemed to be sufficient. At block 404, satellite discovery component 300 is configured to communicate with one or more other components included in user equipment 200 to cause actuation of leveling motor(s) included in the user equipment 200 in order to adjust the tilt of the array plane to within an acceptable range. If leveling motor(s) are absent in user equipment 200, then satellite discovery component 300 is configured to cause a user to be notified (such as on a user device) to manually change the tilt of the array plane. The user can be provided instructions or guidance for performing the tilt adjustment via light emitting diodes (LEDs), a paired app, and/or other indicators.

If the array plane is sufficiently level (yes branch of block 402), then process 400 proceeds to block 406. At block 406, user equipment 200 is configured to be in receive mode. The transceiver 204, modem 206, and antenna assembly 218, including the phased array antenna (or select antenna elements of the phased array antenna), and/or the like can be configured to be in receive mode, ready to detect signals from satellite(s).

Next, at a block 408, satellite discovery component 300 is configured to initiate a coarse scan spiral pattern search for an initial satellite within the constellation. The coarse scan is configured to find any initial satellite within the constellation that is assigned to downlink (DL) to the cell associated with user equipment 200. Before proceeding with the flow diagram of FIG. 4, FIGS. 5A-5C will be discussed next.

Figure 5A:
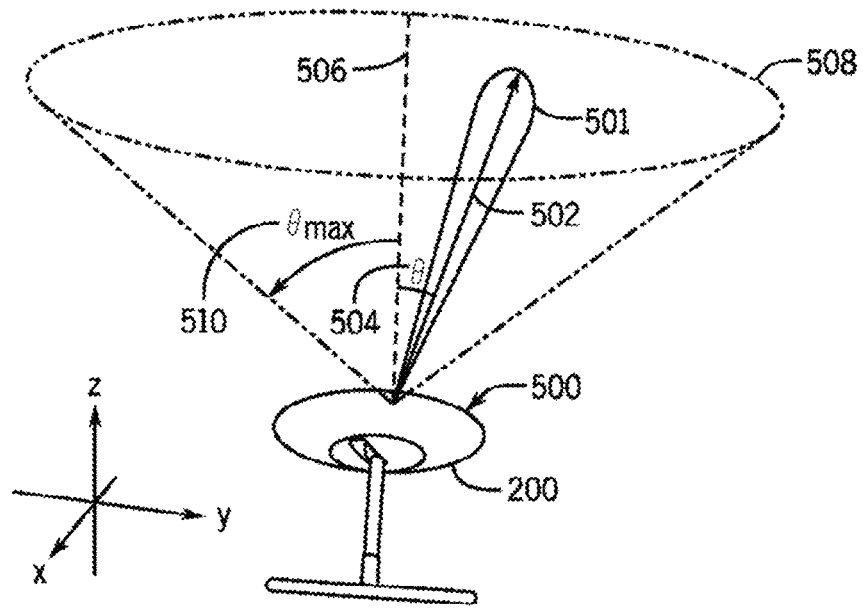
FIG. 5A illustrates a diagram showing an example beam direction of the user equipment in a y-z plane of a Cartesian coordinate system in accordance with various aspects of the present disclosure.

FIG. 5A illustrates a diagram showing an example beam direction of the user equipment 200 in a y-z plane of a Cartesian coordinate system in accordance with various aspects of the present disclosure. User equipment 200 radiates a beam 501 having a beam direction 502. The beam 501 includes a radiation pattern that propagates in a particular angular direction relative to a broadside 506 or an axis perpendicular (e.g., the z-axis of the Cartesian coordinate system) to a plane 500 of the phased array antenna included in user equipment 200. Beam direction 502 is at an angle 504 from the broadside (denoted as angle θ).

Figure 5B:
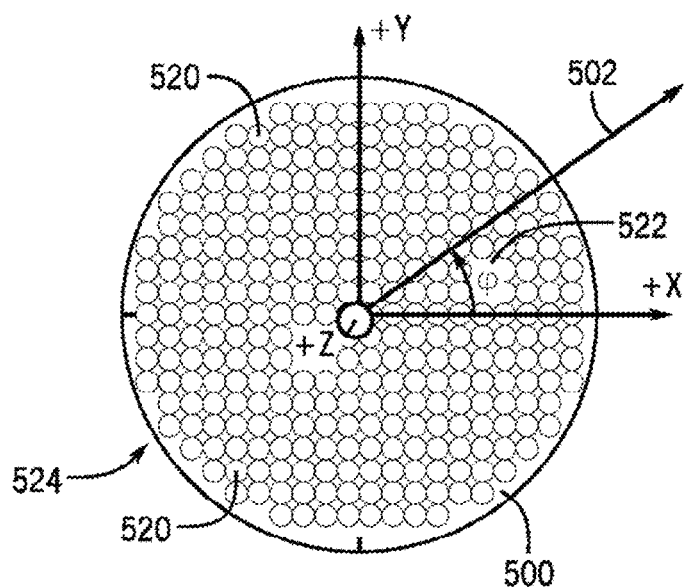
FIG. 5B illustrates a diagram showing a beam having a beam direction in an x-y plane of the Cartesian coordinate system in accordance with various aspects of the present disclosure.

FIG. 5B illustrates a diagram showing beam 501 having the beam direction 502 in an x-y plane of the Cartesian coordinate system in accordance with various aspects of the present disclosure. The radiating side of a phased array antenna 524 is shown, including a plurality of antenna elements 520 included in the phased array antenna 524. The radiating side of phased array antenna 524 defines the plane 500 (also referred to as the array plane). In the x-y plane, beam direction 502 is at an angle 522 (denoted as angle φ) relative to the x-axis.

The beam direction discussed in connection with FIGS. 5A-5B is also applicable for beams to be transmitted. User equipment 200 is configured to transmit a beam towards satellite(s) along a particular direction or trajectory (e.g., along the direction of beam 501).

Satellite discovery component 300 configures phased array antenna 524 of user equipment 200 to receive beams initially pointed in the broadside direction (θ=0 degrees), and then progressively steers the phased array antenna 524 to receive beams in a spiral pattern radiating away from the broadside until some maximum angle from broadside is reached (e.g., $\theta_{max}=\pm 55$ degrees). For example, approximately ±55 degrees can mean 55 degrees plus or minus 15%. The to-be-received beam steering (also referred to as the receive beam steering or receive beam scan steering) can be continuous or at discrete points along the spiral pattern. In either case, enough time lapses before moving to the next steered point in order to detect the presence of a satellite at that point. If pointed discretely, the spacing of points is made sufficiently close for the half-power beam-widths (or minimum detection), to overlap. For example, if this spacing is C, and pointing is given in spherical coordinates (θ,φ), the angles θ,φ can be incremented by (dθ,dφ) in accordance with the following equations.

$$d\theta = \frac{C}{\sqrt{1 + \frac{2\pi}{C}\sin\theta}} \quad \text{Eq. (1)}$$

$$d\varphi = \frac{2\pi}{\sqrt{1 + \frac{2\pi}{C}\sin\theta}} \quad \text{Eq. (2)}$$

Figure 5C:
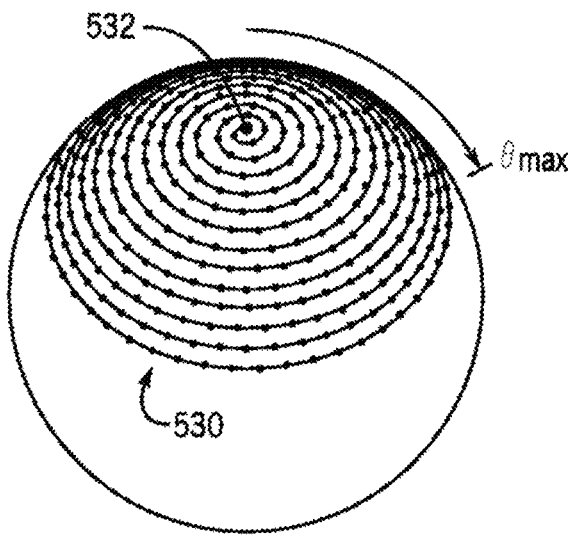
FIG. 5C illustrates an example spiral pattern prescribed by the coarse search performed in accordance with various aspects of the present disclosure.

FIG. 5C illustrates an example spiral pattern 530 prescribed by the coarse search or scan performed at block 408 in accordance with various aspects of the present disclosure. The search starts at an initial point 532 (where θ=0 degrees) and radiates outward in a spiral pattern up to a maximum angle from broadside ($\theta_{max}$). The plurality of points denoted in the spiral pattern 530 represents example discrete points, in the case of discrete or non-continuous scanning. As shown in FIG. 5A, the operable beam steering region associated with the coarse scan is depicted as a cone 508 having an angle 510 from broadside 506 (denoted as $\theta_{max}$). Continuing the above example, the operable beam steering region is ±55 degrees from broadside 506.

At each of the scanning points (continuous or discrete points), satellite discovery component 300 facilitates modem 206 to monitor for a downlink beacon from a satellite, at a block 410 of FIG. 4. In some embodiments, the downlink beacon is correlated against a known radio frame preamble sequence and the correlation is compared against a detection threshold. Satellites are configured to transmit downlink radio frames containing these beacons at a minimum rate, to all ground cells that are within their service region. Alternatively, modem 206 can monitor for a downlink signal that is recognizable by at least one other expected characteristic or parameter. As user equipment 200 steers the receive beam spiral, it dwells long enough in each direction such that it monitors for a duration equal to or exceeding the maximum downlink period of a satellite.

If the receive beam spiral completes without detection of an expected downlink signal (no branch of block 410), then process 400 proceeds to a block 412. At block 412, satellite discovery component 300 is configured to cause the phased array antenna reception (e.g., the receiver portion of transceiver 204) to be configured for a different downlink channel frequency (or some other receiver parameter). Then process 400 returns to block 408 to repeat the coarse scan starting at broadside.

As an example, without limitation, the coarse scan spiral pattern can spiral with a 3 degree separation between trial directions, with a total of approximately 1200 trial directions or scan points. A full coarse spiral scan can be completed within approximately 30 seconds or less. These are example values of the degree of separation and the number of trial directions or scan points. These numbers can vary.

Because each satellite transits the sky at a finite rate (e.g., less than 1 degree/sec), a sufficient rapid spiral search pattern can ensure that a satellite is detected as long as the satellite stays within the conic sky section within ° max of broadside and is transmitting on a frequency that the user equipment 200 is expecting. The receive beam spiral scan can allow for faster satellite discovery than from random search, linear raster scan, tiling scan, or other search patterns.

Figure 5D:
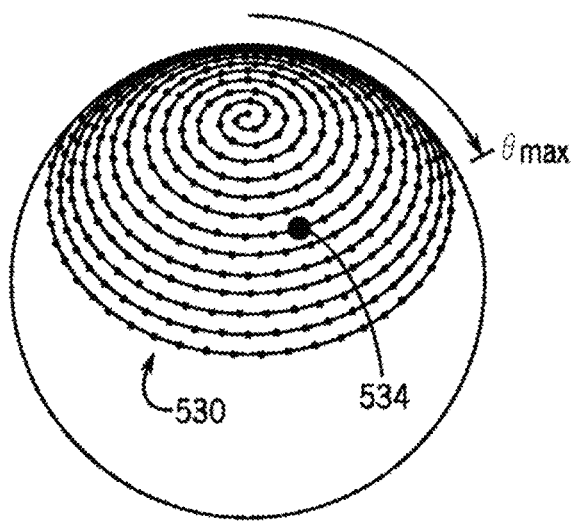
FIG. 5D illustrates the example spiral pattern prescribed by the coarse search including a point at which a downlink signal or beacon is detected in accordance with various aspects of the present disclosure.

If a downlink beacon (or downlink signal) is detected during the spiral scan (yes branch of block 410), then process 400 proceeds to block 414. FIG. 5D illustrates the example spiral pattern 530 prescribed by the coarse search including a point 534 at which a downlink signal or beacon is detected in accordance with various aspects of the present disclosure.

Even if a downlink signal is detected, it is possible that the satellite that sent the downlink signal is some angular distance away from the current point of the spiral scan (e.g., point 534), depending on the receive beam width, downlink signal strength, and/or modem detection threshold. For this reason, a second finer spiral pattern scan is immediately performed in the vicinity of the first detection, at a block 414. This finer spiral scan takes smaller steps or increments, and is centered on the first detection direction and spans an angle θ equal to the detectable width of the receive beam plus a margin for ongoing satellite motion (C+M). In some embodiments, the fine spiral scan is completed in approximately 1 second.

During the fine spiral scan, modem 206 generates a RSSI metric or measurement (e.g., RSSI 214) for each pointing direction in which a downlink signal is detected. Satellite discovery component 300 is configured to monitor the RSSI measurements received from modem 206. Once the fine spiral scan has completed, the pointing direction corresponding to the maximum RSSI is identified by the satellite discovery component 300, at a block 416. The pointing direction corresponding to the maximum RSSI includes the best estimate of the satellite pointing direction. The pointing direction corresponding to the maximum RSSI also includes the output of satellite discovery component 300 and an input to the closed-loop tracking component 302 (to initialize the closed-loop tracking).

Figure 5E:
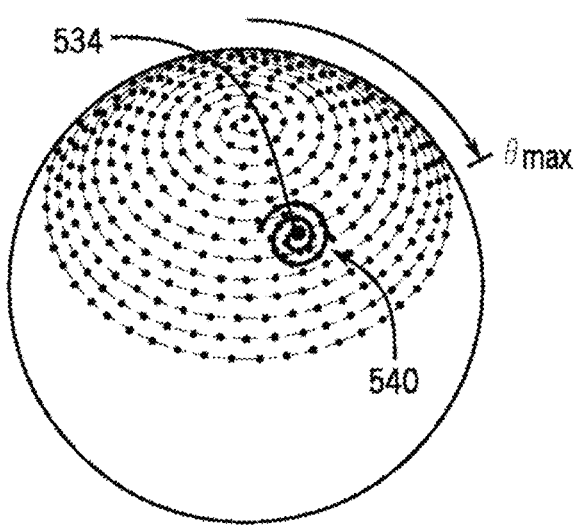
FIG. 5E illustrates the example spiral pattern prescribed by the fine spiral search/scan performed in accordance with various aspects of the present disclosure.

FIG. 5E illustrates the example spiral pattern 540 prescribed by the fine spiral search/scan performed at block 414 in accordance with various aspects of the present disclosure. The starting point of the fine search/scan is at the point 534 (the point of first/initial detection of a downlink signal or beacon) and the spiral radiates outward from there. Notice that the fine spiral pattern 540 is significantly smaller in diameter than the coarse spiral pattern 530. Further, in one aspect, the direction or orientation of the spiraling pattern 540 can be selected to be clockwise or counterclockwise based on some parameter, such as a direction of the movement of the satellite, in order to seek a quicker connection to the satellite.

Prior to performance of process 400, the orientation of user equipment 200, position of any satellite within the constellation (e.g., satellite ephemeris information), nor the downlink frequency is known. At the conclusion of process 400, at least the downlink frequency and the best estimated beam pointing direction for user equipment 200 are known.

With a satellite found and a communication link established with the satellite, closed-loop tracking component 302 is configured to maintain the communication link with the discovered satellite. Closed-loop tracking component 302 is able to maintain the communication link with the satellite as it moves without user equipment orientation or satellite ephemeris information. The communication link is maintained long enough to receive information from the satellite at least as to the satellite ephemeris and other satellite ephemerides, and identify a diverse set of pointing vectors (sets of beam pointing direction angles) for use in the later stage (e.g., the orientation estimation stage 314) in connection with handoff or switching to another satellite. While the closed-loop tracking component 302 employs the beams received by the user equipment 200, transmit beams can be used at the same pointing vectors to enable bi-directional communication during tracking.

Figure 6:
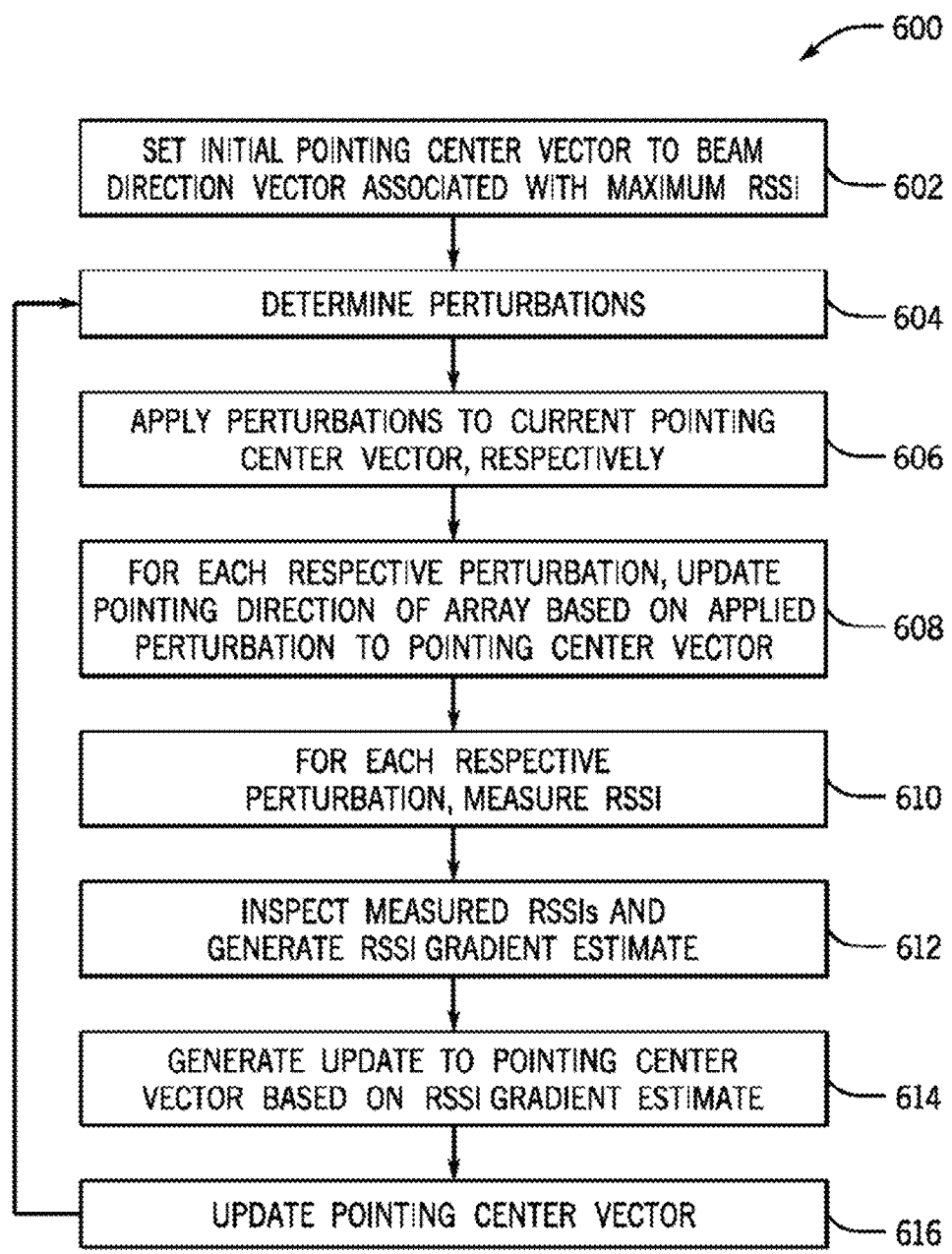
FIG. 6 illustrates a flow diagram showing a process for performing closed-loop tracking by the closed-loop tracking component in accordance with various aspects of the present disclosure.
Figure 7:
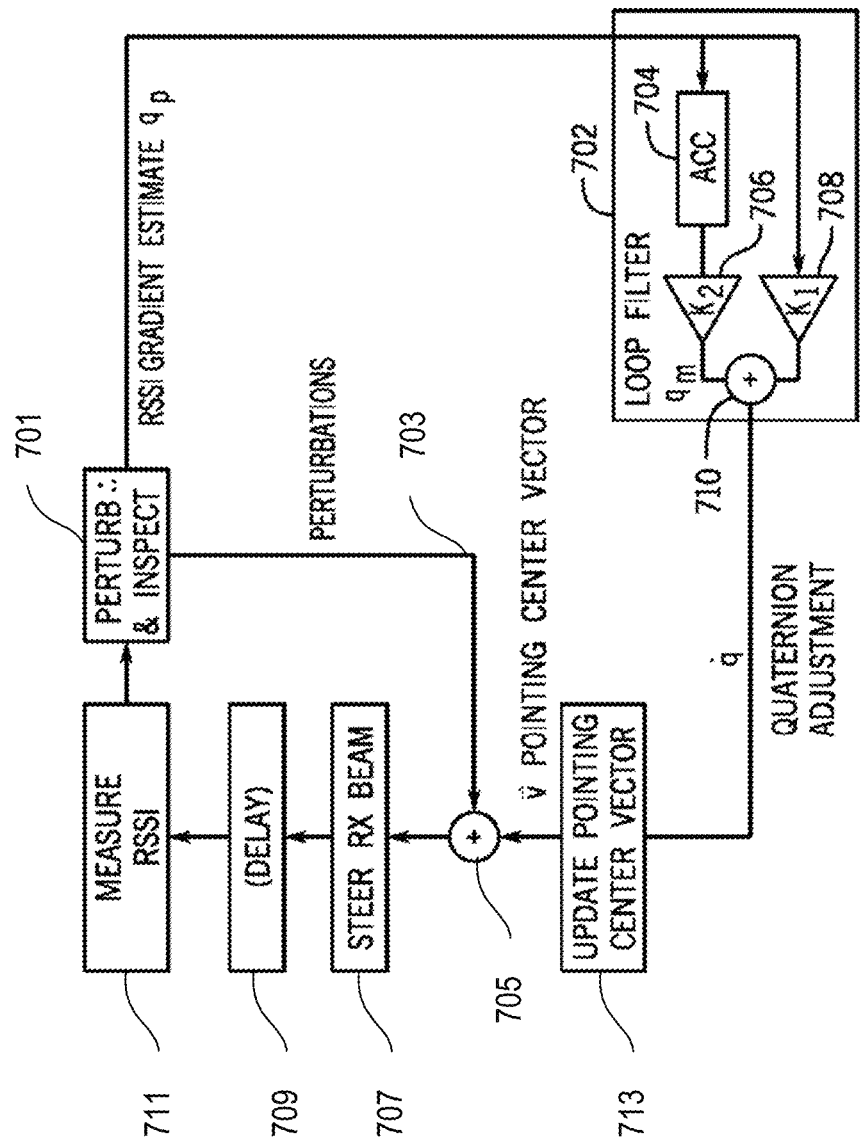
FIG. 7 illustrates a diagram showing an example component architecture with components performing similar operations to the process shown in FIG. 6 in accordance with various aspects of the present disclosure.

FIG. 6 illustrates a flow diagram showing a process 600 for performing closed-loop tracking by the closed-loop tracking component 302 in accordance with various aspects of the present disclosure. FIG. 7 illustrates a diagram showing an example component architecture for performing similar operations to the process 600 of FIG. 6. The components illustrated in FIG. 7 can be included in closed-loop tracking component 302 and/or beam steering controller 201. At a block 602, a pointing center vector $\vec{v}$ is initialized by setting it to the beam direction (also referred to as the beam steering vector, beam pointing vector, beam pointing direction and/or the like) associated with the maximum RSSI outputted by the satellite discovery component 300 (at block 416).

Next, at a block 604, closed-loop tracking component 302 is configured to determine perturbations (See FIG. 7, feature 703) to be added around this pointing center vector. Perturbations can include a triangular pattern with a radius of 0.05 degrees. Other patterns and degree values can be used as well. A set of perturbation pointing vectors are selected to define the corners of an imaginary triangle with the pointing center vector located in the center the imaginary triangle. Each of the perturbation pointing vectors is a slight offset from the pointing center vector. Each perturbation is added or applied to the pointing center vector so as to intentionally point in a slightly different direction from the pointing center vector by a small amount to determine gradients or trends in RSSI measurements. In some embodiments, the perturbations can be less or more than three perturbations and/or prescribe other shapes (e.g., square, rectangle, spiral, etc.). In some embodiments, the perturbations to be added around the pointing center vector can be determined by a perturbation and inspection component 701.

Each perturbation is applied or added (e.g., by adder 705), respectively, to the current pointing center vector, at a block 606. A sum of the current pointing center vector and a respective perturbation is used to update the pointing direction of the phased array antenna, at a block 608, and the received beam corresponding to such pointing direction is analyzed by modem 206 to generate a RSSI measurement or metric (e.g., a signal quality measurement), at a block 610. In some embodiments, the pointing direction of the phased array antenna is updated by a steering RX beam component 707. The RSSI measurement indicates the strength of the received satellite downlink signal during such pointing direction or vector. In some embodiments, the RSSI measurement can be generated by a measure RSSI component 711. In some embodiments, a delay 709 can be applied between updating the pointing center vector with a perturbation (713) and measuring the RSSI measurement or metric. The delay 709 can be used to ensure that the RSSI measurements is associated with the correct pointing direction associated with the updated pointing center vector. Blocks 608 and 610 are performed for each of the remaining summed current pointing center vector and respective perturbation.

Next, at a block 612, closed-loop tracking component 302 is configured to inspect the measured RSSIs (e.g., three RSSI measurements associated with respective three applied perturbations) and generate a RSSI gradient estimate $q_p$ based on the RSSI measurements from block 610. The RSSI gradient estimate can be calculated by weighting the perturbations by the RSSI measurements minus their mean value, or by selecting the direction with the highest RSSI value. In some embodiments, the measured RSSIs can be inspected by the perturbation and inspection component 701.

The RSSI gradient estimate is used to generate an update to the current pointing center vector, at a block 614. In some embodiments, the RSSI gradient estimate includes the input to a loop filter 702 included in the closed-loop tracking component 302 or beam steering controller 210 in general.

Loop filter 702 is configured to smooth the noisy estimates of the RSSI gradient estimates and also to accumulate momentum associated with the linear motion of the satellite. Loop filter 702 includes, for example, a proportional-integral loop filter. Loop filter 702 includes first and second signal paths, the input to each of the first and second signal paths including the RSSI gradient estimate from block 612. An accumulator 704 and an integral loop filter parameter 706 ($K_2$) are included in the first signal path. A proportional loop filter parameter 708 ($K_1$) is included in the second signal path. The outputs of the proportional and integral loop filter parameters 708, 706 include the inputs to an adder 710 also included in loop filter 702.

Accumulator 704 is configured to form a cumulative sum of the received RSSI gradient estimates. The RSSI gradient estimates inputted to accumulator 704 "accumulate" to facilitate smoothing or filtering of noisy RSSI gradient estimates and momentum associated with satellite linear motion. Integral loop filter parameter 706 ($K_2$) is configured to 0.001. Proportional loop filter parameter 708 ($K_1$) is configured to 0.01. The output of adder 710 includes an adjustment to update the (current) pointing center vector.

For example, if the change to the pointing center vector to improve RSSI is described with a rotation quaternion $q_p$, then the momentum rotation $q_m$ is updated as follows:

$$q_m = q_p * q_m \qquad \text{Eq. (3)}$$

The pointing center vector update is described by a rotation quaternion q calculated as:

$$\dot{q} = \text{quatpower}(q_p, K_1) * \text{quatpower}(q_m, K_2) \qquad \text{Eq. (4)}$$

where quatpower ( ) is the quaternion power function, and $K_1$ and $K_2$ are the proportional and integral loop filter parameters, respectively, of the loop filter 702, which are typically set to achieve critically damped convergence.

The update to the current pointing center vector, referred to as the rotation quaternion q or a quaternion adjustment, is used to update the pointing center vector $\vec{v}$, at a block 616. The pointing center vector $\vec{v}$ (a unit pointing center vector) is updated according to $\vec{v} = \text{rotate\_vector}(\vec{v}, \dot{q})$.

Process 600 then returns to block 604 to continue with additional perturbations to the updated current pointing center vector, to continue identifying the direction of increased signal strength. In some aspects, the process 600 can produce pointing center vectors (e.g., beam pointing vectors) that trend toward and/or converge to increasing signal quality values. In some aspects, the process 600 can identify pointing center vectors that converge to a particular signal quality value. In some aspects, the signal quality value can be a maximum RSSI. In some aspects, the maximum RSSI may increase or decrease over time based on atmospheric conditions, interference, and/or the like. Second stage 312 typically operates for the remaining duration of the first satellite pass which may range from 5 to 180 seconds.

In some embodiments, closed-loop tracking component 302 can be configured to randomly permute the order of the sampling perturbations in connection with block 604 in order to mitigate any correlated interference with the RSSI measurements, such as perturbations in the satellite-side antenna pointing, monotonic ramps from changing path loss, or tropospheric scintillations. For conditions in which the phased array antenna of user equipment 200 is vibrating or moving, IMU data 216 (e.g., gyroscope measurements) can be used by the closed-loop tracking component 302 to stabilize the user equipment 200 beam in connection with block 608. In connection with block 614, the closed-loop tracking component 302 can be configured to estimate the steering gradient on every sample time by taking the current perturbation direction as the gradient but inverting the sign if the associated RSSI metric is less than the previous perturbation RSSI metric.

Figure 8:
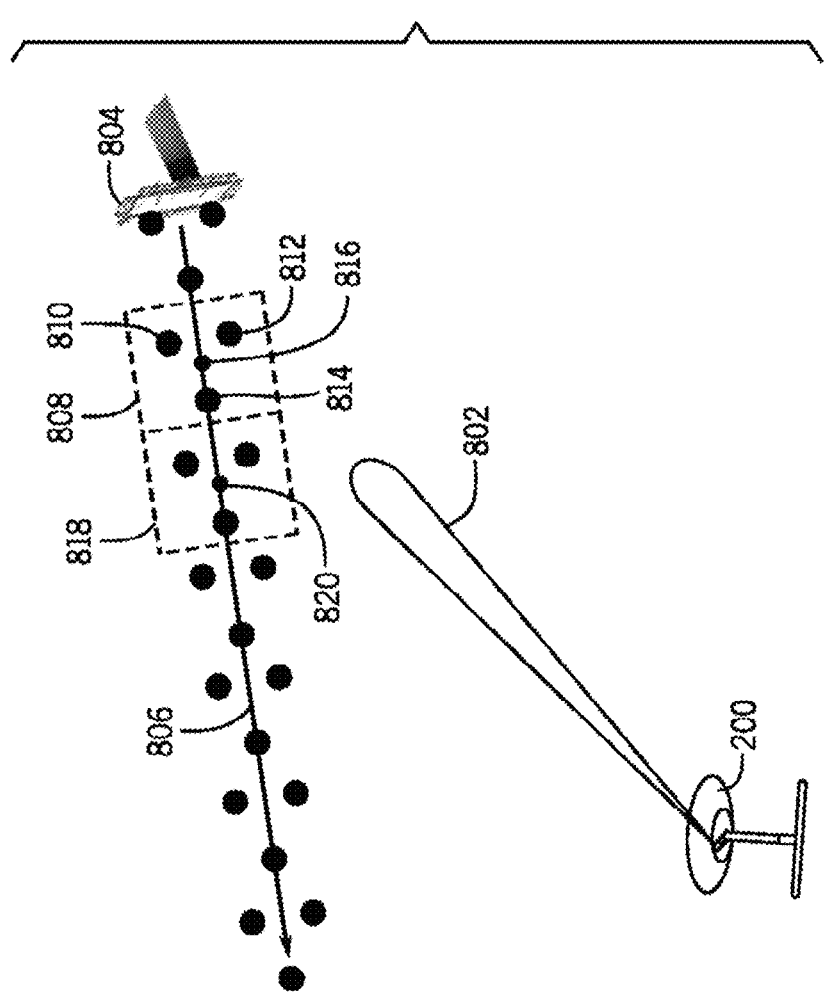
FIG. 8 illustrates an example perturbation pattern in accordance with various aspects of the present disclosure.

FIG. 8 illustrates an example perturbation pattern in accordance with various aspects of the present disclosure. As a satellite 804 (the discovered satellite from first stage 310) traverses its orbit along a trajectory 806, a perturbation set 808 is determined by closed-loop tracking component 302 (e.g., block 604). Perturbation set 808 includes perturbations 810, 812, 814 defining the corners of an imaginary triangle. At the center of the imaginary triangle is a current pointing center vector 816. The current pointing center vector 816 is the current pointing direction of (receive and transmit) beam 802 of user equipment 200. Each of perturbations 810, 812, 814 applied to the current pointing center vector 816 causes the beam 802 to change its pointing direction to a perturbation pointing vector/direction in accordance with the perturbations 810, 812, 814, respectively. Based on the determined RSSI gradient estimate associated with the perturbation set 808, an updated pointing center vector 820 is determined.

The next perturbation set 818 is determined by closed-loop tracking component 302 around the new current pointing center vector 820.

Figure 9:
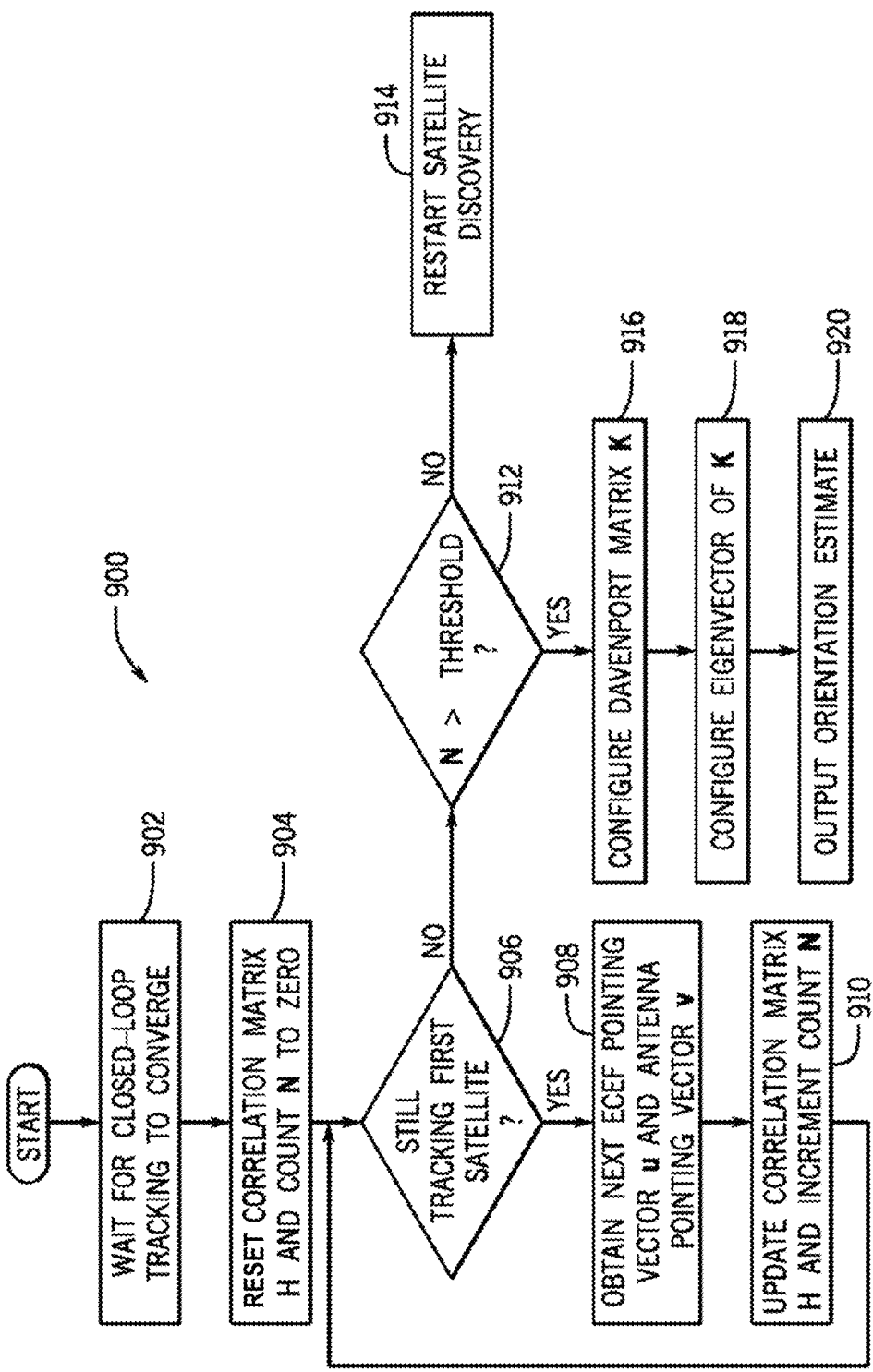
FIG. 9 illustrates a flow diagram showing a process for determining user equipment orientation estimate by the orientation estimation component in accordance with various aspects of the present disclosure.

FIG. 9 illustrates a flow diagram showing a process 900 for determining user equipment 200 orientation estimate by the orientation estimation component 304 in accordance with various aspects of the present disclosure. Orientation estimation component 304 is configured to determine an estimate of the three-axis angles defining the orientation of the array plane 500 of user equipment 200 in three-dimensional (3-D) space (tilt, pan, and roll angles). While the closed-loop tracking component 302 can maintain a communication link with the first/discovered satellite without this orientation estimate, the orientation estimate facilitates being able to establish a communication link with a different satellite from the first/discovered satellite. In addition, the orientation information allows the beam steering controller 210 to reduce or eliminate undesirable perturbations that can be present during closed-loop tracking (the presence of perturbations reduce pointing overall accuracy) by determining pointing directions based on satellite-provided ephemeris.

In a stationary environment, an accelerometer affixed to the phased array antenna assembly can measure the force of gravity to determine the tilt component of orientation. However, most accelerometers, such as low-cost capacitive MEMS devices, lack the absolute accuracy required (typical errors exceed 1 degree). An accelerometer can still be useful for coarse leveling of the array (orienting array broadside approximately towards the sky) but it is insufficient for steering beams as the pan and roll angles remain unknown. A candidate for estimating the other dimensions (pan and roll angles) can be a 3-axis magnetometer (compass), but these are highly susceptible to local magnetic fields, require periodic calibration, and are also too inaccurate. Differential GPS is another option, but is expensive, requires multiple antennas, is difficult to embed, introduces dependencies on strong GPS signal reception, and while more accurate than a magnetometer, it is still unable to achieve accuracy so as to result in less than 0.1 degree pointing error for user equipment 200.

A simpler, less expensive, and substantially more accurate implementation is for the beam steering controller 210 to estimate the orientation from its own measurements. This is done by comparing the expected pointing direction determined based on satellite ephemeris information received by the first/discovered satellite as it moves across the sky with the actual pointing angles determined by the closed-loop tracking component.

At a block 902, orientation estimation component 304 waits for the closed-loop tracking to converge (e.g., 3 seconds). A set of pointing vectors (in the antenna frame) that closed-loop tracking converges to over time is saved as V={$\vec{v}_1$, $\vec{v}_2$, ... }. Each pointing vector in the antenna frame of reference is referred to as an antenna pointing vector or antenna-frame pointing vector $\vec{v}$. Simultaneously, a set of pointing vectors from user equipment 200 to satellite in Earth-centered Earth-fixed (ECEF) coordinates is saved as U={$\vec{u}_1$, $\vec{u}_2$, ... }. Each pointing vector in the ECEF frame of reference is referred to as an ECEF pointing vector $\vec{u}$. The ECEF pointing vectors are based on the downlink satellite ephemeris information. Each of the pointing vectors includes a unit pointing vector.

Figure 10:
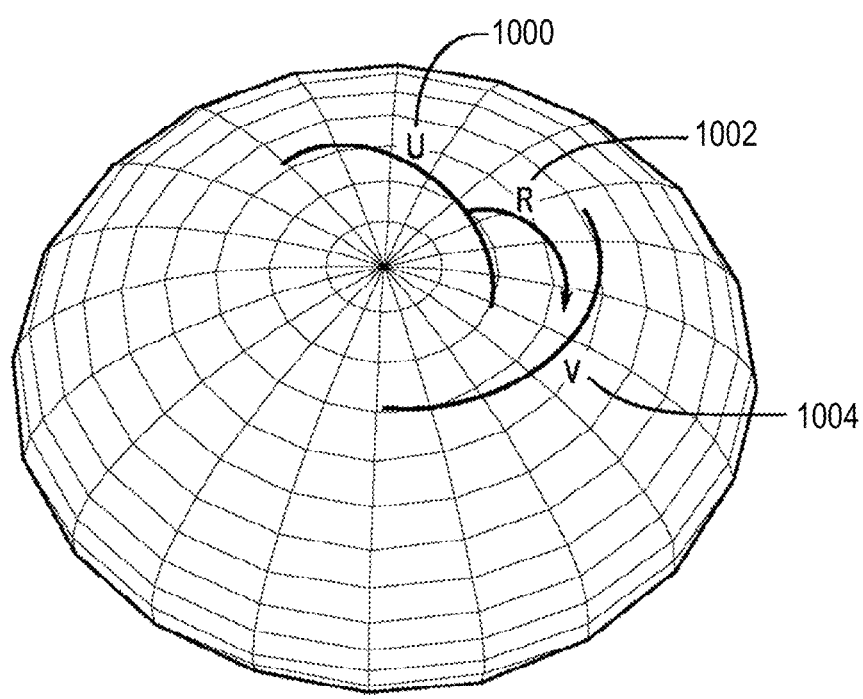
FIG. 10 illustrates a pictorial depiction of ECEF pointing vectors mapped to antenna-frame pointing vectors using a three-dimensional rotation $R$ in accordance with various aspects of the present disclosure.

Estimating the orientation of the user equipment 200 includes estimating the three-dimensional rotation $R$ that maps ECEF pointing vectors U to antenna-frame pointing vectors V. FIG. 10 illustrates a pictorial depiction of ECEF pointing vectors U 1000 mapped to antenna-frame pointing vectors V 1004 using a three-dimensional rotation $R$ 1002 in accordance with various aspects of the present disclosure. This can be achieved by minimizing the sum of square errors, $$J(R) = \sum_{k=1}^{N} \|\vec{v}_k - R\vec{u}_k\|^2 \qquad \text{Eq. (5)}$$

subject to $R^{-1} = R^T$ and $\|R\|=1$.

Because $\vec{u}_k$ and $\vec{v}_k$ are unit vectors, this is equivalent to minimizing, $$J(R) = -\sum_{k=1}^{N} \vec{v}_k^T R \vec{u}_k. \qquad \text{Eq. (6)}$$

This optimization can be implemented by correlating the ECEF pointing vectors U with the antenna-frame pointing vectors V from closed-loop tracking to form a 3×3 matrix $H$, referred to as a correlation matrix, as follows.

$$H = \frac{1}{N}\sum_{k=1}^{N} \vec{u}_k^T \cdot \vec{v}_k \qquad \text{Eq. (7)}$$

At a block 904, orientation estimation component 304 is configured to reset or initialize the correlation matrix $H$ and a count N to zero. If the user equipment 200 is still tracking the first/discovered satellite (yes branch of block 906), then process 900 proceeds to block 908. At block 908, orientation estimation component 304 is configured to obtain the next ECEF pointing vector $\vec{u}$ from satellite ephemeris and the next antenna-frame pointing vector $\vec{v}$ from the closed-loop tracking component 302. The correlation matrix $H$ is updated based on the pointing vectors from block 908 and the count N is incremented by one, at a block 910. Correlation matrix $H$ is updated as follows.

$$H = H + u^*v^T \qquad \text{Eq. (8)}$$

In the first iteration, N=0 and the first ECEF pointing vector and the first antenna-frame pointing vector form the correlation matrix $H$. After block 910, process 900 returns to block 906.

If the user equipment 200 continues to track the first/discovered satellite (yes branch of block 906), then process 900 proceeds to blocks 908 and 910 to update the correlation matrix $H$ with the second ECEF pointing vector and second antenna-frame pointing vector. Correlation matrix $H$ is now a function of the first and second ECEF pointing vectors and the first and second antenna-frame pointing vectors. This loop continues until the user equipment 200 stops tracking the first/discovered satellite (no branch of block 906). Then process 900 proceeds to block 912.

At block 912, a check is performed for whether the count N is greater than a pre-set threshold. The pre-set threshold is selected to be indicative of a sufficient number of measurements having been taken. For example, the threshold can be set to 100. The threshold can be dynamic as well and adjust based on detected data or factors. If count N is less than a threshold (no branch of block 912) and the user equipment 200 has stopped tracking the first/discovered satellite (no branch of block 906), then the satellite moved out of view before sufficient measurements were taken or some kind of interruption or error occurred during the first stage 310 and/or second stage 312. Accordingly, satellite discovery stage 310 (e.g., process 400) is restarted at a block 914.

If count N is greater than the threshold (yes branch of block 912), then process 900 proceeds to block 916. At block 916, the orientation estimation component 304 is configured to generate or form a Davenport matrix $K$ based on the correlation matrix $H$. Other matrix structures could be used as well. The example Davenport matrix K includes a 4×4 matrix with entries $h_{i,j}$ of the correlation matrix H as set forth below.

$$K = \begin{bmatrix} h_{1,1} - h_{2,2} - h_{3,3} & h_{2,1} + h_{1,2} & h_{3,1} + h_{1,3} & h_{2,3} - h_{3,2} \\ h_{2,1} + h_{1,2} & -h_{1,1} + h_{2,2} - h_{3,3} & h_{3,2} + h_{2,3} & h_{3,1} - h_{1,3} \\ h_{3,1} + h_{1,3} & h_{3,2} + h_{2,3} & -h_{1,1} - h_{2,2} + h_{3,3} & h_{1,2} - h_{2,1} \\ h_{2,3} - h_{3,2} & h_{3,1} - h_{1,3} & h_{1,2} - h_{2,1} & h_{1,1} + h_{2,2} + h_{3,3} \end{bmatrix} \qquad \text{Eq. (9)}$$

At a block 918, orientation estimation component 304 solves for the eigenvector of the Davenport matrix $K$ of Equation 9. The optimal estimate of the user equipment 200 orientation is given by a rotation quaternion $q_{ecef2body}$, which is the unit eigenvector of $K$ associated with the maximum positive eigenvalue of $K$. This eigenvector can be calculated by any of a standard eigensolver method, singular value decomposition, Rayleigh quotient iterations, and/or the like. The solved rotation quaternion $q_{ecef2body}$ includes the orientation estimate of the user equipment 200 (and more particularly, of the array plane 500), which is outputted by orientation estimation component 304 to orientation tracking component 306, at a block 920.

The solved rotation quaternion $q_{ecef2body}$ represents the transformation from satellite ephemeris pointing direction in ECEF coordinates to the actual phased array antenna pointing direction in the antenna/body reference frame. As such, the proper pointing direction by user equipment 200 to any new satellite can be calculated directly by rotating the ephemeris-derived ECEF pointing direction of the new satellite by the $q_{ecef2body}$ rotation quaternion.

Figure 11:
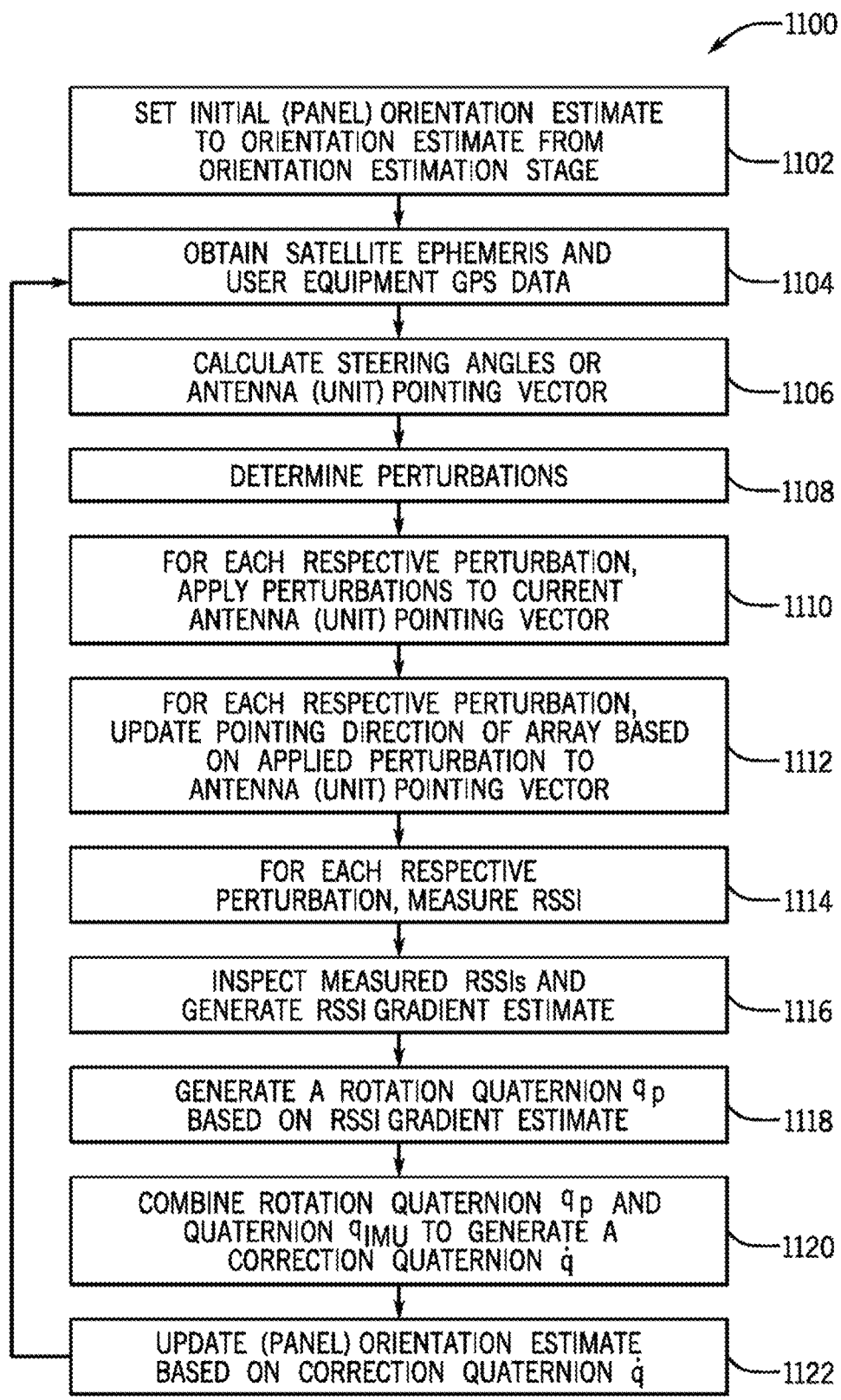
FIG. 11 illustrates a flow diagram showing a process for tracking the user equipment orientation by the orientation tracking component in accordance with various aspects of the present disclosure.
Figure 12:
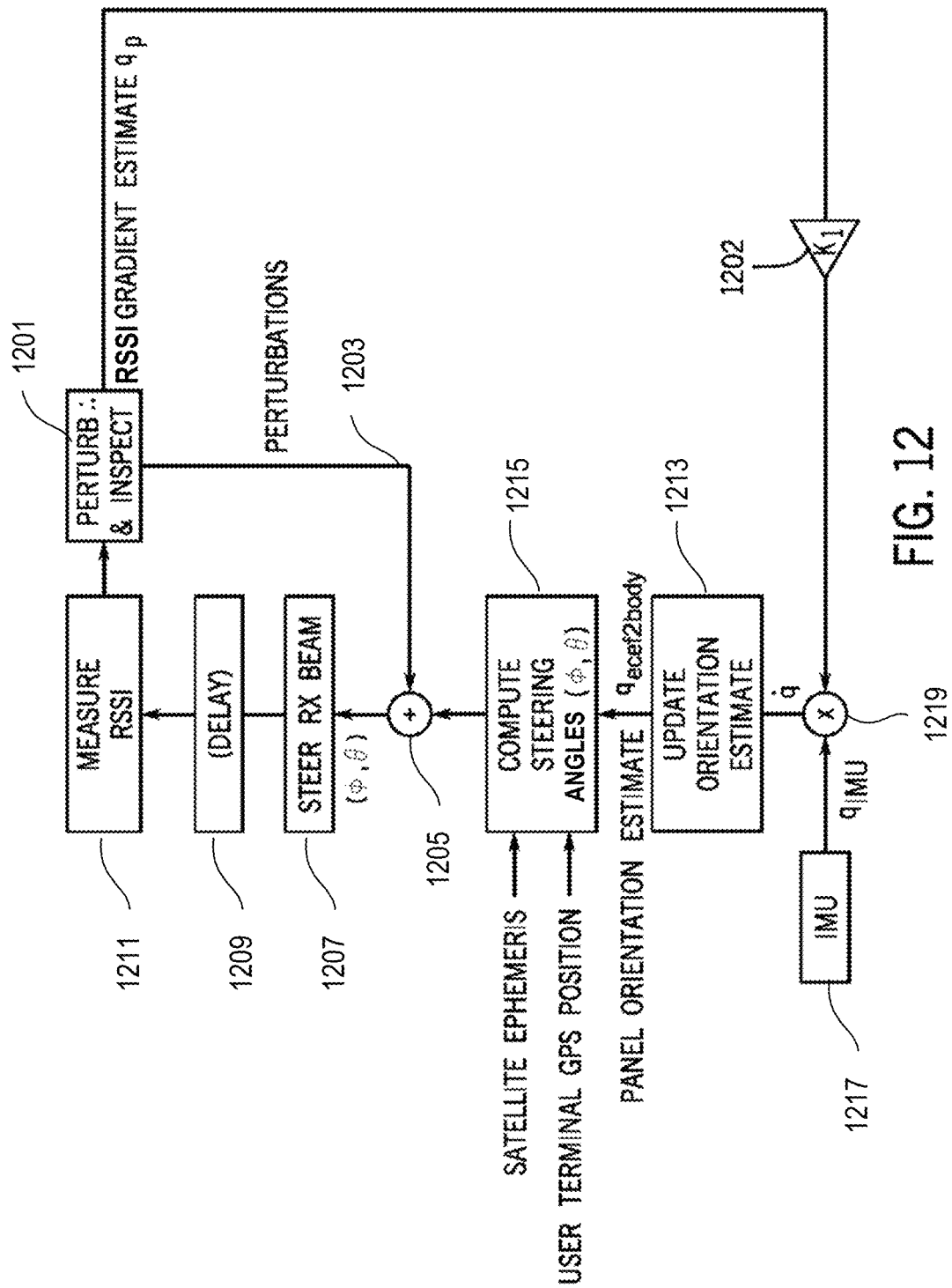
FIG. 12 illustrates a diagram showing an example component architecture with components performing similar operations to the process shown in FIG. 11 in accordance with various aspects of the present disclosure.

FIG. 11 illustrates a flow diagram showing a process 1100 for tracking the user equipment 200 orientation by the orientation tracking component 306 in accordance with various aspects of the present disclosure. The orientation tracking stage 316 addresses potential changes in the orientation of the phased array antenna, which can be included in an antenna assembly (e.g., antenna assembly 218 of FIG. 2), of the user equipment 200, over time. Orientation changes can occur in a static installation from wind-induced vibration, building sway, etc. or from self-actuation if the user equipment 200 is equipped with motors to dump snow or rain on the phased array antenna. Change in orientation is also presumed if user equipment 200 is on a mobile platform such as a bus, boat, plane, etc. FIG. 12 illustrates a diagram showing an example component architecture with components performing similar operations to the process 1100 of FIG. 11. The components illustrated in FIG. 12 can be included in closed-loop tracking component 302 and/or beam steering controller 201.

At a block 1102, an initial panel orientation estimate is set to the orientation estimate $q_{ecef2body}$ from completion of the orientation estimation stage 314. At a block 1104, the current satellite ephemeris and GPS data (e.g., the current position of the user equipment 200) are obtained.

Next, at a block 1106, orientation tracking component 306 is configured to calculate the current antenna unit pointing vector for the phased array antenna of the user equipment 200. Antenna unit pointing vector includes the beam steering angles 212 provided to transceiver 204. Antenna unit pointing vector is also referred to as steering angles, antenna unit pointing vector, antenna pointing vector, antenna unit pointing center vector, unit pointing center vector, beam pointing vector, beam direction, pointing direction, beam pointing direction, and/or the like. In some embodiments, a unit pointing vector $\vec{v}$ is calculated from the ECEF position of the user equipment 200 (provided by the GPS data), $\vec{U}_{ECEF}$, and the satellite ECEF position (provided from downlink satellite ephemeris), $\vec{S}_{ECEF}$, as follows.

$$\vec{w} = \vec{S}_{ECEF} - \vec{U}_{ECEF}$$ Eq. (10)
$$\vec{v} = \vec{w}/\sqrt{\vec{w}^T \cdot \vec{w}}$$

The resulting unit pointing vector is rotated by the current (or initial) panel orientation estimate $q_{ecef2body}$ to form the antenna unit pointing vector. In some embodiments, the antenna unit pointing vector can be formed at a compute steering angles component 1215. The compute steering angles component 1215 can receive the GPS data, satellite ephemeris, and panel orientation estimates as inputs, and produce the antenna unit pointing vector as an output.

To the antenna unit pointing vector computed in block 1106, small pointing perturbations can be added to determine the current, proper antenna unit pointing vector at which the phased array antenna (receiver) beam is to be steered, at blocks 1108-1116. Blocks 1108-1116 are similar to, and can perform similar functionality as, respective blocks 604-612 except the orientation tracking perturbations and the antenna unit pointing vector from block 1106 are used.

At a block 1108, the process 1100 can determine orientation tracking perturbations (1203) to be added around the antenna unit pointing vector from block 1106. These orientation tracking perturbations differ from the closed-loop perturbations applied in process 600 in that the orientation tracking perturbations are typically much smaller perturbations around the antenna unit pointing vector than the closed-loop perturbations around the pointing center vector of process 600. The orientation tracking perturbations can define an imaginary triangle similar to the closed-loop perturbations. In some embodiments, the perturbations to be added around the pointing center vector can be determined by a perturb and inspect component 1201.

Each perturbation is applied or added (e.g., by adder 1205), respectively, to the current pointing center vector, at a block 1110. Each of the orientation tracking perturbations is applied or added to the antenna unit pointing vector determined in block 1106 one at a time.

At a block 1112, the phased array antenna can be configured to have a beam direction in accordance with the combination of the antenna unit pointing vector and applied orientation tracking perturbation. In some embodiments, the beam direction of the phased array antenna can be configured by a steering RX beam component 1207.

At a block 1114, a RSSI measurement or metric (e.g., a signal quality measurement) obtained before the next perturbation is applied to the antenna unit pointing vector. In some embodiments, a delay 1209 can be applied between updating the antenna unit pointing vector or orientation estimate 1213 with a perturbation and measuring the RSSI measurement or metric 1211. The delay 1209 can be used to ensure that the RSSI measurement 1211 is associated with the correct pointing direction associated with the updated unit pointing vector. In some embodiments, the RSSI measurement or metric can be obtained by measure RSSI component 1211.

Next, at a block 1116, the orientation tracking component 306 is configured to inspect the measured RSSIs and generate a RSSI gradient estimate in the direction of increasing RSSI. Because the perturbations are smaller, this RSSI gradient estimate is relatively noisier compared to the RSSI gradient estimate calculated in the closed-loop tracking stage 312.

The RSSI gradient estimate includes the input to a proportional parameter 1202 ($K_1$). The RSSI gradient estimate (e.g., gradient direction) is formed into a rotation quaternion $q_p$ having a rotation angle scaled by the parameter 1202 to take into account the uncertainty of the noisy estimate, at a block 1118. In some embodiments, RSSI gradient estimate can be generated by a perturbation and inspection component 1201.

Next, at a block 1120, orientation tracking component 306 combines or multiplies (e.g., at multiplier 1219) the rotation quaternion $q_p$ from block 1118 and a quaternion $q_{IMU}$ formed from the gyroscope measurements of IMU 1217 (which can correspond to IMU 208 above). In some cases, the gyroscope measurements of IMU 1217 can corresponding to the angular rotation measured since the last update. The result is generation of a correction quaternion $\dot{q}$.

$$\dot{q} = \text{quatpower}(q_p, K_1) * q_{IMU}$$ Eq. (11)

The correction quaternion $\dot{q}$ is used to update the panel orientation estimate $q_{ecef2body}$, at a block 1122 (e.g., at update orientation estimate component 1213), in accordance with the following equation. The panel orientation estimate $q_{ecef2body}$ is also referred to as an orientation estimate quaternion.

$$q_{ecef2body} = q_{ecef2body} * \dot{q} \qquad \text{Eq. (12)}$$

The panel orientation estimate $q_{ecef2body}$ includes an updated estimate of the orientation of the user equipment's phased array antenna which takes into account any motion of the user equipment.

This new estimate is used to calculate the next antenna unit pointing vector, whereby process 1100 returns to block 1104. Process 1100 repeats as many times as necessary to identify possible changes to the user equipment 200 orientation over time and/or for switching to a different satellite. The update rate of the control loop is set sufficiently high and the latency sufficiently low, in order to track motion at the highest angular rates the user equipment 200 may experience.

If using low-cost IMU gyroscopes such as integrated MEMS devices, there can be significant errors in the IMU data or measurements, such as rate offsets or temperature-dependent drift, which are accounted for in process 1100. At user equipment 200 start up, an offset calibration can be run to remove bulk offset. After this, the orientation tracking feedback loop automatically eliminates further gyroscope drift using the orientation tracking perturbations and RSSI feedback as an absolute reference for orientation. The parameter $K_1$ is typically chosen to be sufficiently large to keep up with the gyroscope drift rates but sufficiently small so as to not introduce unnecessary pointing noise from the gradient estimates. The perturbation sizes can also increase to reduce the gradient estimate noise as necessary (at the expense of perturbation noise).

In this manner, a user equipment receive and/or transmit beam can be accurately electronically steered and maintained to point at a satellite, regardless of the user equipment's actual orientation, motion, or vibration—thereby maximizing service quality, data rates, and/or overall network efficiency. The electronic beam steering technique disclosed herein combines multiple receive-signal strength measurements from a satellite, onboard gyroscope (IMU) measurements, and satellite ephemeris to estimate the user equipment's absolute orientation in 3-D space in real-time (or near real-time). This provides feedback to a user for installation of the user equipment with a service-optimal tilt and broadside pointing. And during normal operation, the disclosed technique maintains beam steering control to maximize communication link signal-to-noise ratio (SNR) with a satellite and provides the correct pointing during handoff between NGO satellites.

The disclosed technique also allows user equipment to operate on mobile platforms such as automobiles, tractors, planes, and/or ships or under high wind loads by computing an active stabilization of the beam.

In some embodiments, the beam steering technique of the present disclosure can be implemented using an aerial vehicle other than a satellite. For example, an airplane, unmanned aerial vehicle (UAV), and/or the like can include communication equipment to serve as a communication node with user equipment.

Figure 13:
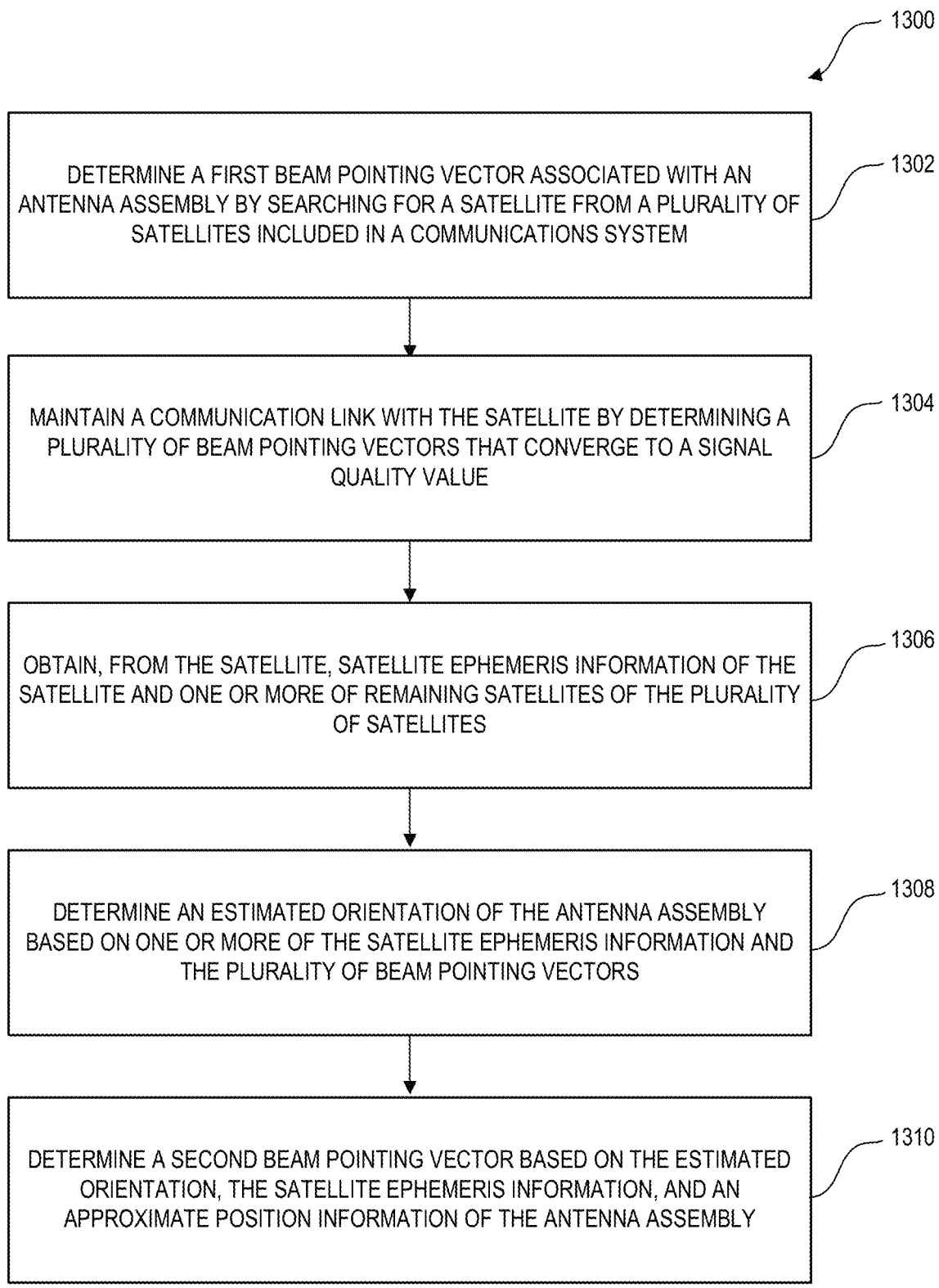
FIG. 13 illustrates a flowchart illustrating an example method for determining beam pointing vectors.

Having disclosed example systems, components and concepts, the disclosure now turns to the example method 1300 for determining beam steering angles, as shown in FIG. 13. The steps outlined herein are non-limiting examples provided for illustration purposes, and can be implemented in any combination thereof, including combinations that exclude, add, or modify certain steps.

At a block 1302, the method 1300 can include determining a first beam pointing vector associated with an antenna assembly by searching for a satellite (102) from a plurality of satellites (102, 104, 106) included in a communication system (100). The antenna assembly can be included in and/or coupled to a user terminal (110, 112, 114, 116). In some embodiments, searching for the satellite can include performing a coarse scan of a sky from zero degrees of a broadside (506) of the antenna assembly (218) to a predetermined maximum angle from the broadside; if a downlink signal is detected during the coarse scan performing a fine scan of the sky around one or more degrees from the broadside at which the downlink signal is detected; and measuring a RSSI (e.g., a signal quality measurement) at each search point of a plurality of search points of the fine scan. In some embodiments, one or both of the coarse scan (530) or the fine scan (540) includes a spiral pattern scan. The coarse spiral pattern and the fine spiral pattern may be performed in a same orientation (both clockwise or counterclockwise) or in different orientations.

At a block 1304, the method 1300 can include maintaining a communication link with the satellite by determining a plurality of beam pointing vectors that converge to a signal quality value (e.g., an RSSI value). In some embodiments, the signal quality value is a maximum RSSI value. In some embodiments, the signal quality value increases or decreases over time.

At a block 1306, the method 1300 can include obtaining, from the satellite, satellite ephemeris information of the satellite (102) and one or more of remaining satellites of the plurality of satellites (102, 104, 106).

At a block 1308, the method 1300 can include determining an estimated orientation (e.g., determined at 920) of the antenna assembly (218) based on the satellite ephemeris information and the plurality of beam pointing vectors.

At a block 1310, the method 1300 can include determining a second beam pointing vector based on the estimated orientation, the satellite ephemeris information, and an approximate position information of the antenna assembly. In some embodiments, based on the second beam pointing vector, whether to switch the communication link with the satellite to a second satellite of the plurality of satellites or maintain the communication link with the satellite.

In some embodiments, an initial beam pointing vector used to obtain the plurality of beam pointing vectors comprises a beam pointing vector having a highest RSSI measurement from a pointing search performed prior to establishing the communication link with the satellite. In some embodiments, at least a subset of the plurality of beam pointing vectors comprises one or more of a first perturbation added to the initial beam pointing vector, a second perturbation added to the initial beam pointing vector, and a third perturbation added to the initial beam pointing vector, and wherein the first, second, and third perturbations are different from each other.

In some embodiments, the method 1300 may be performed by one or more computing devices or apparatuses. In one illustrative example, the method 1300 can be performed by a user terminal (e.g., 110, 112, 114, 116) shown in FIG. 1 and/or one or more computing devices with the architecture of platform 1400 shown in FIG. 14. In some cases, such a computing device or apparatus may include a processor, microprocessor, microcomputer, or other component of a device that is configured to carry out the steps of the method 1300. In some examples, such computing device or apparatus may include one or more antennas for sending and receiving RF signals. In some examples, such computing device or apparatus may include an antenna and a modem for sending, receiving, modulating, and demodulating RF signals, as previously described The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 1300 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
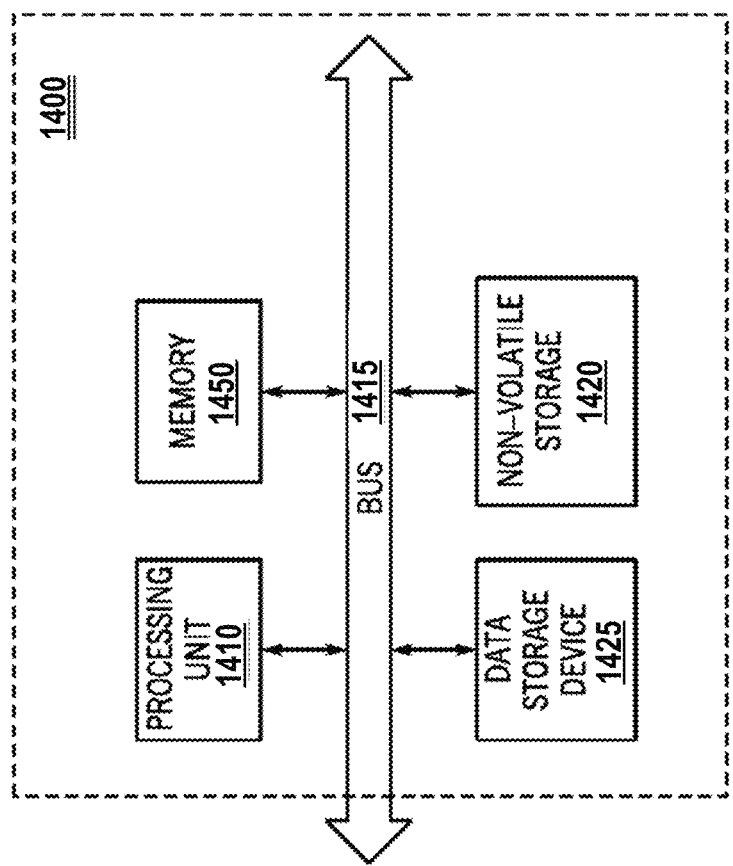
FIG. 14 illustrates a block diagram showing an example platform or device that can be implemented in the user equipment in accordance with various aspects of the present disclosure.

FIG. 14 illustrates a block diagram showing an example platform or device that can be implemented in the user equipment 200 in accordance with various aspects of the present disclosure. Platform 1400 includes at least a portion of any of processor 202, beam steering controller 210, modem 206, satellite discovery component 300, closed-loop tracking component 302, orientation estimation component 304, and/or orientation tracking component 306. Platform 1400 as illustrated includes bus or other internal communication means 1415 for communicating information, and processor 1410 coupled to bus 1415 for processing information. The platform further includes random access memory (RAM) or other volatile storage device 1450 (alternatively referred to herein as main memory), coupled to bus 1415 for storing information and instructions to be executed by processor 1410. Main memory 1450 also may be used for storing temporary variables or other intermediate information during execution of instructions by processor 1410.

Platform 1400 also can include read only memory (ROM), static storage, or non-volatile storage device 1420 coupled to bus 1415 for storing static information and instructions for processor 1410, and data storage device 1425 such as a magnetic disk, optical disk and its corresponding disk drive, or a portable storage device (e.g., a universal serial bus (USB) flash drive, a Secure Digital (SD) card). Data storage device 1425 is coupled to bus 1415 for storing information and instructions.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit (ASIC) or otherwise.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. A device comprising:
    an antenna assembly configured to transmit and receive beams with a first satellite;
    a modem electrically coupled to the antenna assembly; and
    a beam steering controller electrically coupled to each of the antenna assembly and the modem, the beam steering controller configured to determine a beam pointing direction of the antenna assembly to be able to one or both of switch a first communication link with the first satellite to a second communication link with a second satellite or establish and maintain the first communication link with the first satellite,
    wherein at a start of a determination of the beam pointing direction, one or more of an orientation of the antenna assembly is unknown, positions of a plurality of satellites are unknown, or downlink frequencies of the plurality of satellites are unknown, and
    wherein the beam steering controller is configured to find any satellite of the plurality of satellites that is assigned to downlink to a cell associated with the device to yield a found satellite, wherein the found satellite comprises the first satellite, and wherein the beam steering controller is configured to establish the first communication link with the first satellite.

2. The device of claim 1, wherein the device is subject to change in position or orientation caused by one or more of wind, vibration, building sway, self-actuated movement, re-installation, or installation on a mobile platform.

3. The device of claim 1, wherein the beam steering controller comprises a satellite discovery component, a closed-loop satellite tracking component, an orientation estimation component, and an orientation tracking component.

4. The device of claim 1, wherein the antenna assembly is in a receive mode, wherein:
the beam steering controller is configured to cause the antenna assembly to perform a coarse scan of a sky from zero degrees of a broadside of the antenna assembly to a pre-determined maximum angle from the broadside;
if a downlink signal is detected during the coarse scan, the beam steering controller is configured to cause the antenna assembly to perform a fine scan of the sky around one or more degrees from the broadside at which the downlink signal is detected; and
the modem is configured to measure a received signal strength indicator (RSSI) at each search point of a plurality of search points of the fine scan.

5. The device of claim 4, wherein one or both of the coarse scan or the fine scan comprises a spiral pattern scan.

6. The device of claim 4, wherein the pre-determined maximum angle is approximately ±55 degrees.

7. The device of claim 4, wherein the coarse scan is completed in approximately 30 seconds or less.

8. The device of claim 4, wherein, if the downlink signal is not detected during the coarse scan, the beam steering controller is configured to cause the antenna assembly to change a receiver frequency and to perform a second coarse scan of the sky prior to performance of the fine scan.

9. The device of claim 1, wherein the beam steering controller is configured to maintain the first communication link with the first satellite for a time period sufficient to obtain satellite ephemeris information of the first satellite and one or more remaining satellites of the plurality of satellites and to obtain a plurality of beam pointing directions to the first satellite that converge based on increasing strengths of received signal strength indicator (RSSI) measurements by the modem at respective beam pointing directions of the plurality of beam pointing directions.

10. The device of claim 9, wherein an initial beam pointing direction used to obtain the plurality of beam pointing directions comprises a beam pointing direction having a highest RSSI measurement from a pointing search performed prior to establishing the first communication link with the first satellite.

11. The device of claim 10, wherein at least a subset of the plurality of beam pointing directions comprises one or more of a first perturbation added to the initial beam pointing direction, a second perturbation added to the initial beam pointing direction, and a third perturbation added to the initial beam pointing direction, and wherein the first, second, and third perturbations are different from each other.

12. The device of claim 9, wherein the beam steering controller comprises a proportional-integral loop filter.

13. The device of claim 1, wherein the beam steering controller is configured to determine an estimated orientation of the antenna assembly based on satellite ephemeris information of the first satellite and one or more remaining satellites of the plurality of satellites obtained from the first satellite and a plurality of beam pointing directions to the first satellite that converged based on increasing strengths of received signal strength indicator (RSSI) measurements by the modem at respective beam point directions of the plurality of beam pointing directions.

14. The device of claim 13, wherein the satellite ephemeris information of the first satellite is correlated with the plurality of beam pointing directions to yield a correlation, the correlation used to form a matrix, and a unit eigenvector of the matrix associated with a maximum positive eigenvalue of the matrix comprises a rotation quaternion.

15. The device of claim 14, wherein the rotation quaternion comprises the estimated orientation of the antenna assembly, and wherein the rotation quaternion permits transformation from a satellite ephemeris pointing direction in Earth-centered Earth-fixed (ECEF) coordinates to an antenna beam pointing direction in an antenna reference frame.

16. The device of claim 1, wherein the beam steering controller is configured to update the beam pointing direction responsive to change in one or both of location or the orientation of the antenna assembly.

17. The device of claim 1, further comprising an inertial measurement unit (IMU) electrically coupled to the beam steering controller and configured to provide compensation for dynamic rotation of the antenna assembly, wherein:
the beam steering controller is configured to apply perturbations to an initial beam pointing direction and obtain signal strength measurements from the modem for each respective applied perturbation to the initial beam pointing direction;
the beam steering controller is configured to generate a gradient estimate in a direction of increasing signal strength measurements; and
the beam steering controller is configured to determine a corrected current orientation of the antenna assembly to account for biases, drift, or other errors in an IMU estimate.

18. The device of claim 17, wherein the beam steering controller is configured to determine an updated beam pointing direction based on the corrected current orientation of the antenna assembly.

19. The device of claim 17, wherein the IMU includes a gyroscope and a global positioning system (GPS) receiver.

* * * * *